United States Patent [19]
Oki et al.

[11] Patent Number: 5,812,532
[45] Date of Patent: Sep. 22, 1998

[54] COMMUNICATION NETWORK DESIGN METHOD AND COMMUNICATION EQUIPMENT

[75] Inventors: Eiji Oki; Naoaki Yamanaka, both of Tokyo, Japan

[73] Assignee: Nippon Telegraph & Telephone Corporation, Tokyo, Japan

[21] Appl. No.: 521,981

[22] Filed: Aug. 31, 1995

[30] Foreign Application Priority Data

Aug. 31, 1994 [JP] Japan ..................................... 6-207520
Aug. 31, 1994 [JP] Japan ..................................... 6-207526
Feb. 27, 1995 [JP] Japan ..................................... 7-038796

[51] Int. Cl.$^6$ ............................. H04L 12/46; H04L 12/56
[52] U.S. Cl. ........................ 370/255; 370/397; 370/406; 370/409
[58] Field of Search ................................... 370/254–258, 370/389, 397, 400, 401, 406, 407, 408, 409, 463, 351, 352, 217, 218, 225, 228, 250; 340/825.01, 825.02, 825.03, 826, 827, 825.5, 825.51

[56] References Cited

U.S. PATENT DOCUMENTS 5,153,877  10/1992  Esaki et al. ............................. 370/462
5,453,981   9/1995  Katsube et al. ......................... 370/232
5,583,860  12/1996  Iwakawa et al. ........................ 370/232
5,608,721   3/1997  Natarajan et al. ...................... 370/351
5,610,910   3/1997  Focsaneanu et al. .................... 370/351

OTHER PUBLICATIONS

"Design and Analysis of ATM Networks", Computer Networks Research Group, Dept of Computer Science University of Massachusetts, 1997.

"Special Issue on Optical Signal Processing and its Application for Telecommunications" IEICE Transactions on Communications, vol. E78–B No. 5 May 1995.

Primary Examiner—Benedict V. Safourek
Assistant Examiner—Seema S. Rao
Attorney, Agent, or Firm—Cushman, Darby & Cushman IP Group of Pillsbury, Madison & Sutro LLP

[57] ABSTRACT

In order to establish virtual channel networks on an ATM network, a different virtual channel handler interconnection network for each media or service consisting of information to be transferred is established on a virtual path network; and virtual channel networks corresponding to these media or services are formed by the respective virtual channel handler interconnection networks, whereby a plurality of independent virtual channel networks for different media or services are established simultaneously on a single physical network.

17 Claims, 28 Drawing Sheets

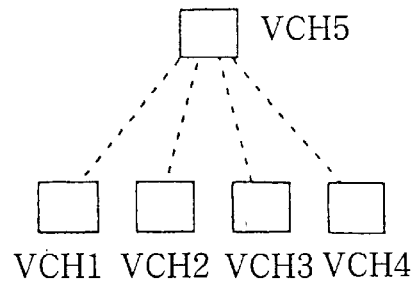
FIG.4(a) Category 1
(e.g., telephony)
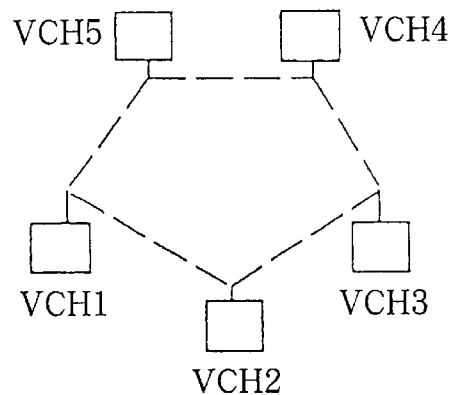
FIG.4(b) Category 2
(e.g., electronic mail)
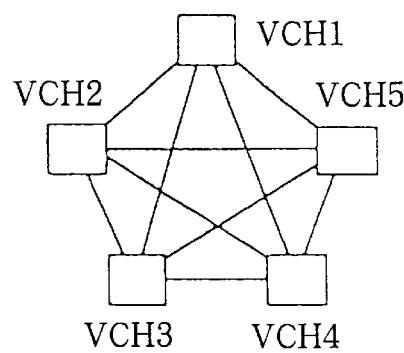
FIG.4(c) Category 3
(e.g., on-line banking)

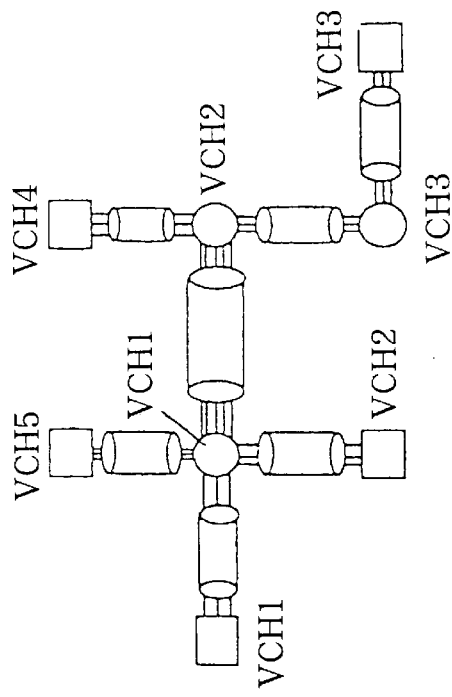
FIG.5(a) Configuration of physical network.
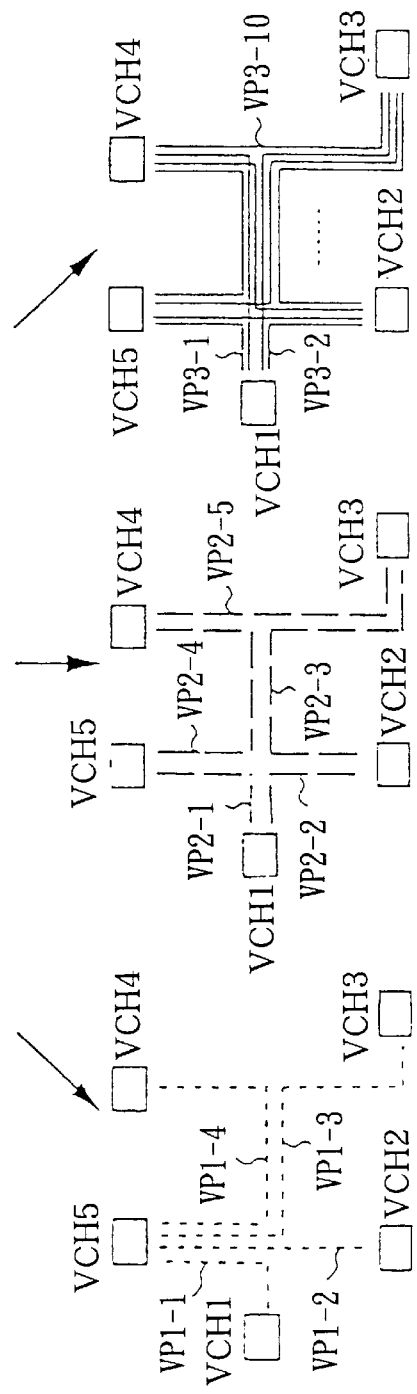
FIG.5(b) Category 1.   FIG.5(c) Category 2.   FIG.5(d) Category 3.

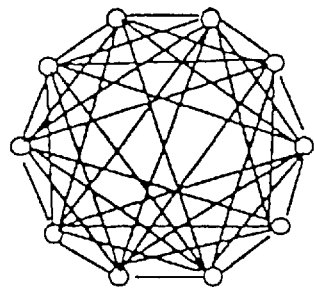
FIG.14(d) D=8
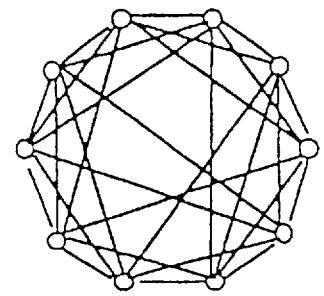
FIG.14(c) D=6
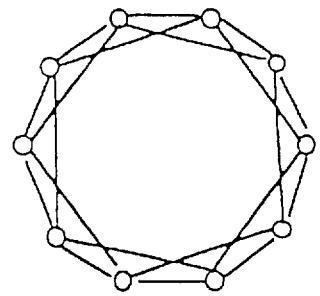
FIG.14(b) D=4
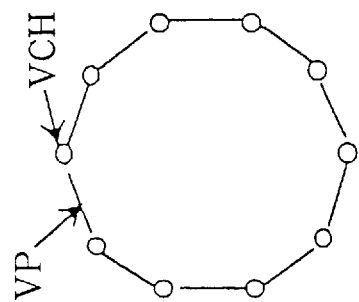
FIG.14(a) D=2

COMMUNICATION NETWORK DESIGN METHOD AND COMMUNICATION EQUIPMENT

BACKGROUND OF THE INVENTION

1. Field of the Invention

This invention is utilized in asynchronous transfer mode (ATM) communication networks, and relates in particular, to techniques for actualizing a different network topology for each media or service on a single physical network and communication equipment associated therewith.

2. Description of the Related Art

FIG. 1 and FIG. 2 show the configurations of two conventional communication networks. The network shown in FIG. 1 may be utilized for telephony, and comprises: local switches 11 and 13 accommodating subscriber lines; transit switch 12 interconnecting local switches 11 and 13; transmission links 14 interconnecting local switches 11 and 13 and transit switch 12; and cross-connect switches 15. FIG. 2 illustrates a communication system typified by Ethernet, wherein cross-connect switches 21 and transmission links 22 are connected in a single loop or a single bus, and add/drop multiplexers 23 are provided for inserting and branching off information via a subscriber line 20.

With conventional network configurations, two communication networks have been necessary for the different topologies of the two services mentioned above. This is so because a service, such as telephony, occupies considerable resources due to the fact that each call is at a constant bit rate (CBR) and has a comparatively long connection time. Also, traffic is dispersed over a wide area, and as a result, transit switches are required due to the necessity of concentrating circuits for long-distance communication. On the other hand, other services transmit data at a variable bit rate (VBR) with the traffic itself in the form of bursts, and although the peak rate is high, the average rate is low and some degree of delay is allowed. A network utilized for data transmission, therefore, has a topology whereby a bus or a loop is shared as a single resource.

Because services with different traffic characteristics have thus used physical networks with separate topologies, there is the problem that there will be a different optimum topology every time a new service or media appears in this multimedia age, resulting in the need for many networks. To put it another way, each service will require its own coaxial or optical fiber cable. However, this arrangement lacks flexibility.

It is an object of the present invention to provide an efficient and flexible network design method and communication equipment which solve the above problems.

The present invention provides a communication network design method which: 1) physically connects, by means of a transmission link network, a plurality of virtual channel handlers (VCHs) which perform switching in units of virtual channels (VCs), and a virtual path handler (VPH) which changes over information transfer routes in units of virtual paths (VPs) that accommodate a plurality of VCs; 2) establishes a VP network on a transmission link network, the VP network being formed from VPs which logically connect a plurality of VCHs; and 3) establishes a VC network on the VP network, the VC network being formed from VCs which logically connect subscribers. The communication network design method is characterized in that a different VCH interconnection network for each media or service is established on the VP network, and a VC network corresponding to a given media or service is formed by means of each VCH interconnection network, whereby a plurality of independent VC networks for different media or services are established simultaneously on a single physical network.

In other words, in order to actualize an ideal topology for each media or service on a single physical network, logical connections between VCHs are established for each media or service in an ATM network comprising a VC network and a VP network. The VCs of these media or services are established on the VCH interconnection networks thereby obtained.

The term "media" used herein pertains to a communication system with a distinctive set of communication standards, quality, mode, capacity, and so forth. For example, "media" encompasses voice communication and image communication; the latter is subdivided into still and moving images. Still images are further subdivided into recorded images (FAX) and display images (LCD), while moving images are subdivided into standard TV images and simplified TV images. A plurality of media generally coexist in a single communication system (this is termed "multimedia") and each media uses a different kind of signal and has a different signal quality requirement. The quality that users require for each media includes specified values for call blocking probability, cell loss probability, and delay, for example.

The VC and VP networks of an ATM network correspond, respectively, to the circuit and path networks in a conventional network. The VP network is a network which is established logically on a physical network, and it can logically connect all VCHs in a mesh. The VC network is a network which logically connects subscribers on the VP network by means of VCs.

A VCH interconnection network, as used in this invention, is formed by means of a logical network which connects subscriber VCHs used by a given media or service and a plurality of transit VCHs. VCs for this media or service are established by selection on this VCH interconnection network only. A VCH interconnection network for a given media or service corresponds to the VC network of that media or service. However, since a VC network is a network with subscribers as the terminal points, it establishes connections between subscribers and VCHs as well as between VCHs; whereas a VCH interconnection network is a network which establishes logical connections between VCHs. Although a VCH interconnection network does not take connections to subscribers into consideration, designing VCH interconnection networks suited to each media or service is equivalent to designing VC networks suited to the same media or services.

All VCHs can be connected in a mesh by ensuring that a VP which does not pass through any other VCH can be established between any two given VCHs. The establishment of a VCH interconnection network may be performed by assigning different VPs to each media or service consisting of information to be transferred. Alternatively, it is also feasible to establish a VCH interconnection network by allowing a plurality of media or services with the same destination VCH to be assigned to the same VPs. In this case, priority control should be performed between VPs with the same destination in accordance with a priority ranking of the media or services.

The network topologies of a plurality of VCH interconnection networks for different kinds of media or service may also be designed simultaneously after taking their overall optimization into consideration. Alternatively, they may be designed in a particular order.

When designing in a particular order, an optimized network topology may be obtained by calculating the network resource efficiency from the working VP ratio, which is defined as the ratio of working VP capacity to total VP capacity (i.e., both working and back-up VPs), and from the VP use efficiency, which has been calculated from the traffic type, traffic demand and required cell loss probability in VCs established between subscribers utilizing this VCH interconnection network. In this case, the number of disjoint routes D (i.e., the number of paths between origin and destination VCHs which do not pass through the same VPHs or VP links) may be set as a parameter of trial network topologies, and satisfying the given number of disjoint routes D may be set as a constraint. A trial network topology, wherein the total length of all the VP links is minimized, is then formed, and the number of disjoint routes D is changed when the trial network topology is changed. The network resource efficiency may then be calculated for the trial network topology obtained.

Network topologies can also be designed simultaneously so that overall network cost is minimized. In this case, connection or disconnection of VP connections between VCHs for establishing a VCH interconnection network may be performed in parallel with establishing VCH interconnection networks for other media or services.

When a plurality of network topologies are designed in a particular order, the design priority order should be determined in the order of decreasing network cost of the media or services supported by the VCH interconnection networks in question. After network topologies have been designed in this manner, the proportion of overall network cost accounted for by the network cost of the VCH interconnection network for each media or service can be calculated and the design priority order can be obtained in accordance with the results of this calculation. If this design priority order is different from a previous trial, the design of network topologies can be repeated in accordance with the new design priority order. A limit may be set for the number of such repetitions.

It is also feasible to classify media or services into a priority group and a non-priority group according to their network cost. The design of VCH interconnection network topologies for the priority group is performed in the order of decreasing network cost, while the design of VCH interconnection network topologies for the non-priority group is performed simultaneously so that overall network cost is minimized.

When designing network topology, it is desirable to set an upper limit for the number of VPs passed through from an origin VCH to a destination VCH.

The present invention also provides communication equipment which has: 1) a plurality of VCHs which perform switching in units of VCs; 2) a VPH which changes over routes in units of VPs which accommodate a plurality of VCs; 3) a transmission link network which physically connects the plurality of VCHs and the VPH; and 4) a higher order means which establishes a VP network on the transmission link network, the VP network being formed from VPs which logically connect the plurality of VCHs, and which also establishes a VC network on this VP network, the VC network being formed from VCs which logically connect subscribers. The communication equipment is characterized in that the higher order means includes: 1) a VCH interconnection network establishing means which establishes, on the VP network, a different VCH interconnection network for each media or service; and 2) a means which forms a VC network corresponding to a given media or service on the basis of each VCH interconnection network, whereby a plurality of VC networks for different media or services are established simultaneously on a single physical network.

Further objects features and characteristics of the present invention, as well as the functions of the related elements of structure, and the economies of manufacture will become more apparent upon consideration of the following description and the appended claims with reference to the accompanying drawings all of which form a part of the specification, wherein like reference numerals designate corresponding parts of the various features.

BRIEF DESCRIPTION OF THE DRAWINGS

FIGS. 4(a)–4(c) show examples of logical network topologies for various services;

FIGS. 5(a)–5(d) show configurations for actualizing a plurality of topologies on a single physical network;

FIGS. 14(a)–14(d) show trial network topologies when the number of disjoint routes D has been set as a parameter;

DETAILED DESCRIPTION OF THE PRESENTLY PREFERRED EXEMPLARY EMBODIMENTS

Figure 1:
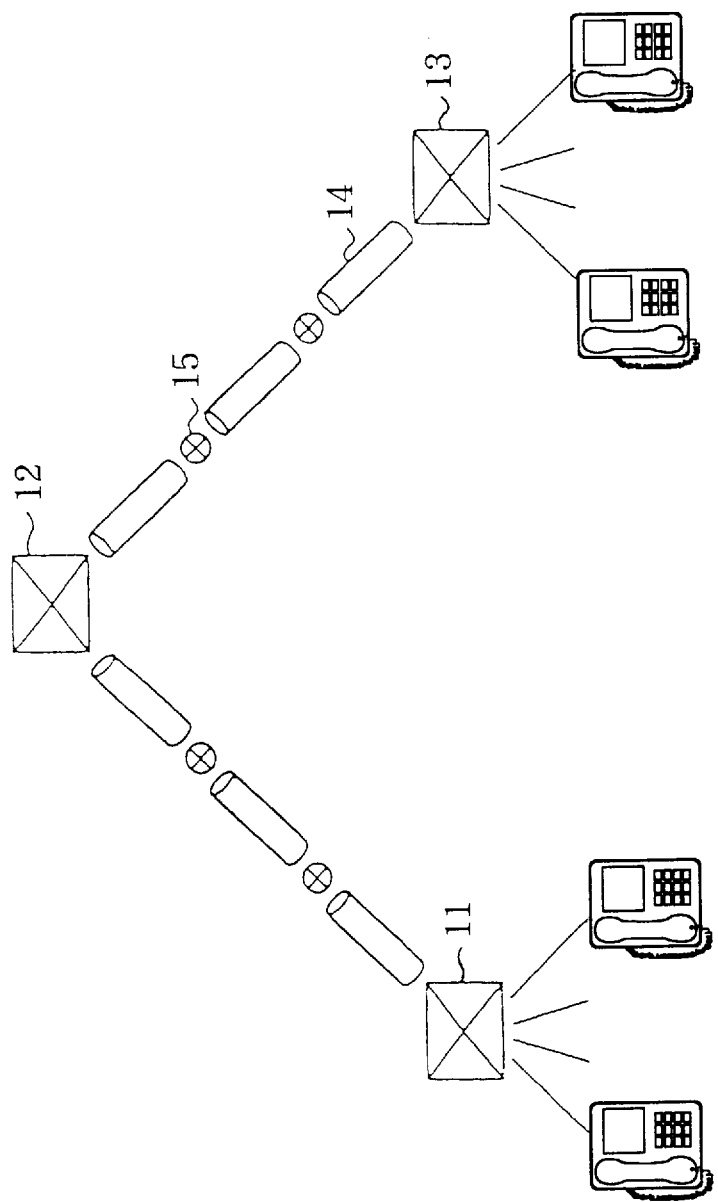
FIG. 1 shows a conventional communication network configuration.
Figure 2:
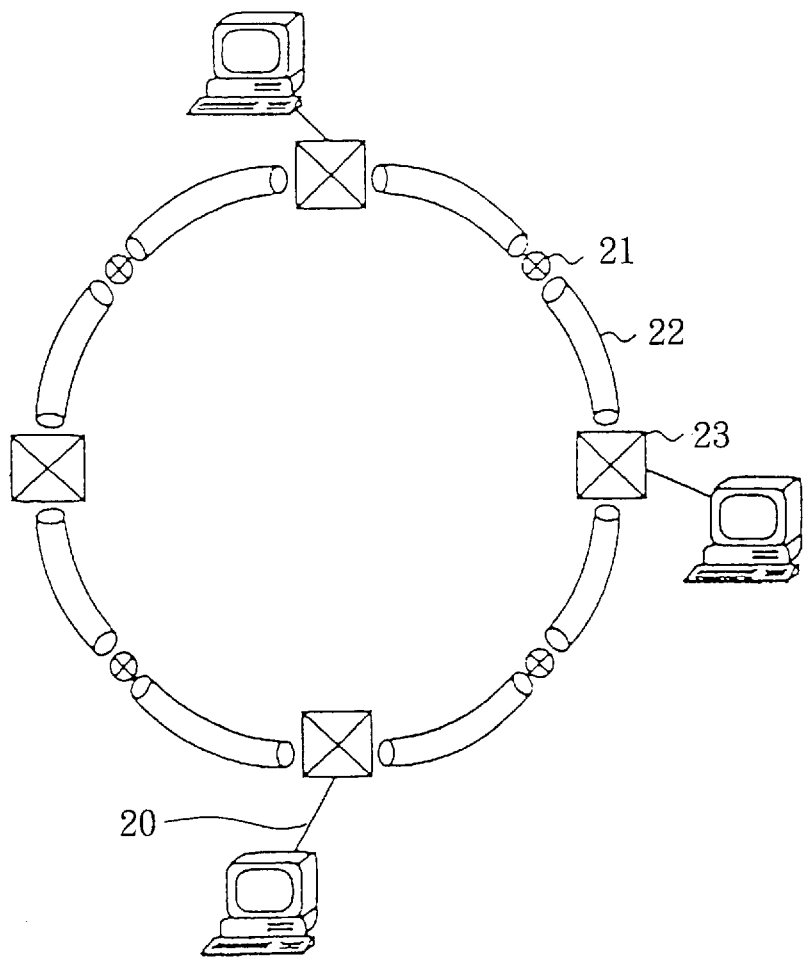
FIG. 2 shows another conventional communication network configuration.
Figure 3:
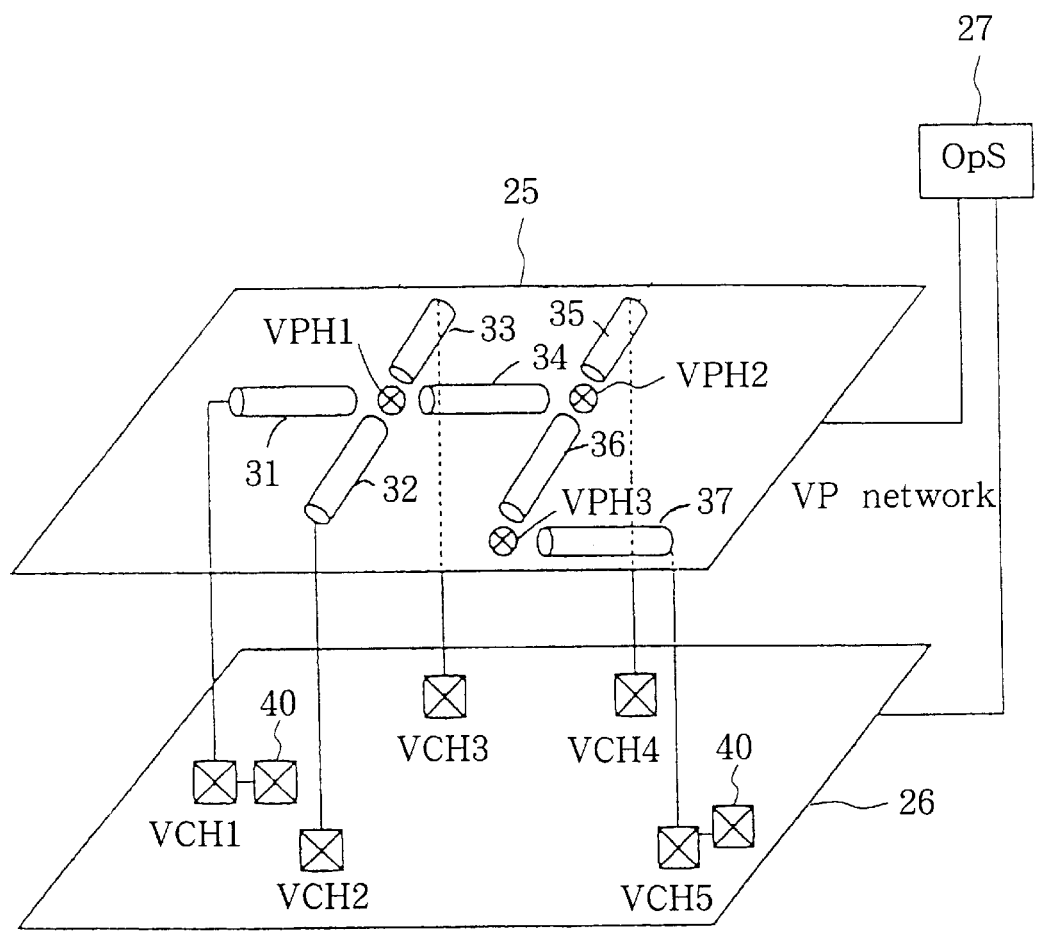
FIG. 3 is a block diagram showing communication equipment according to a first embodiment of the present invention.

FIG. 3 is a block diagram showing communication equipment according to a first embodiment of this invention. This equipment includes: a plurality of virtual channel handlers VCH1–VCH5 which perform switching in units of VCs that logically connect subscribers 40; VPH1–VPH3 which switch the routes of these VCs in units of VPs which accommodate a plurality of VCs; a transmission link network formed from transmission links 31–37 which physically connect VCH1–VCH5 and VPH1–VPH3; and an operation system OpS 27 which establishes, on this transmission link network, a VP network 25 formed from VPs that logically connect VCH1–VCH5, and also establishes, on this VP network, a VC network 26 formed from VCs. OpS can establish a VP between any two VCHs that does not pass through any other VCH. It can also simultaneously establish a plurality of VC networks for different media or services on a single physical network by establishing, on the VP network, a different VCH interconnection network for each media or service consisting of information to be transferred, and by using each VCH interconnection network to form a VC network corresponding to that media or service.

VCH1–VCH5 are respectively arranged in various regions, and any given VCHs can be connected directly via the VP network. Although there are circumstances in which a connection between VCHs will involve passing through one or more of VPH1–VPH3, VPH1–VPH3 do not need to be switched in VC units and generally operate faster and with simpler hardware than VCH1–VCH5. Accordingly, a VP network in which the routes of the paths are switched by VPH1–VPH3 is a fast, high-quality network with little cell loss.

FIGS. 4(a)–4(c) show examples, realizable by means of this invention, of logical VCH interconnection network topologies for various services. In the examples shown here, the VCH interconnection networks are all formed from VPs. Category 1 shown in FIG. 4(a) is a star topology as typified by telephony; Category 2 shown in FIG. 4(b) is a loop topology as typified by electronic mail and data transfer systems; while Category 3 shown in FIG. 4(c) is a mesh topology as utilized for on-line banking, etc., where especially high reliability is required.

FIGS. 5(a)–5(d) show the configurations which realize the plurality of VCH interconnection network topologies shown in FIGS. 4(a)–4(c) on a single physical network. FIG. 5(a) shows the configuration of the physical network, while FIGS. 5(b)–5(d) show the respective VCH interconnection network topologies. In Category 1, VCH5 is taken as a transit VCH and VCH1–VCH4 are taken as local VCHs. VCH5 is connected to VCH1–VCH4 by virtual paths VP1–1 to VP1–4, and all traffic among VCH1–VCH4 can be connected via VCH5. In Category 2, which is completely independent from the VPs of Category 1, the loop topology is realized by means of virtual paths VP2–1 to VP2–5. In the case of Category 3, the mesh topology is realized by means of virtual paths VP3–1 to VP3–10, independently of Categories 1 and 2. VCHs can thus be connected using VPs in such manner that the desired topologies are obtained. In these topologies, VCH5 (by way of example) functions as a transit VCH in Category 1; as an add-drop VCH in Category 2; and as a local VCH in Category 3.

Figure 6:
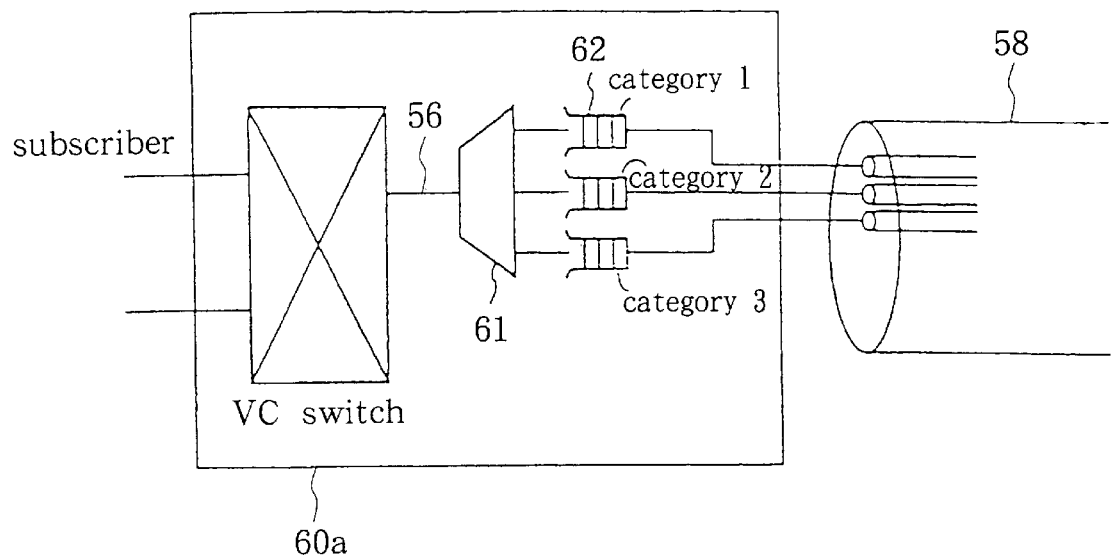
FIG. 6 shows an example of a VCH configuration.

FIG. 6 shows an example of the configuration of a VCH 60a. This VCH has a service distribution part 61 which distributes cells with the same destination received on line 56. It also has, for each category of topology, a shaper 62 which temporarily stores distributed cells and then sends them to a respective separate VP via a transmission line 58. Each VCH assigns a VP to each service and performs shaping at the speed required for each service category. A VP is established for each destination: i.e., for each destination VCH, and for each service.

Figure 7:
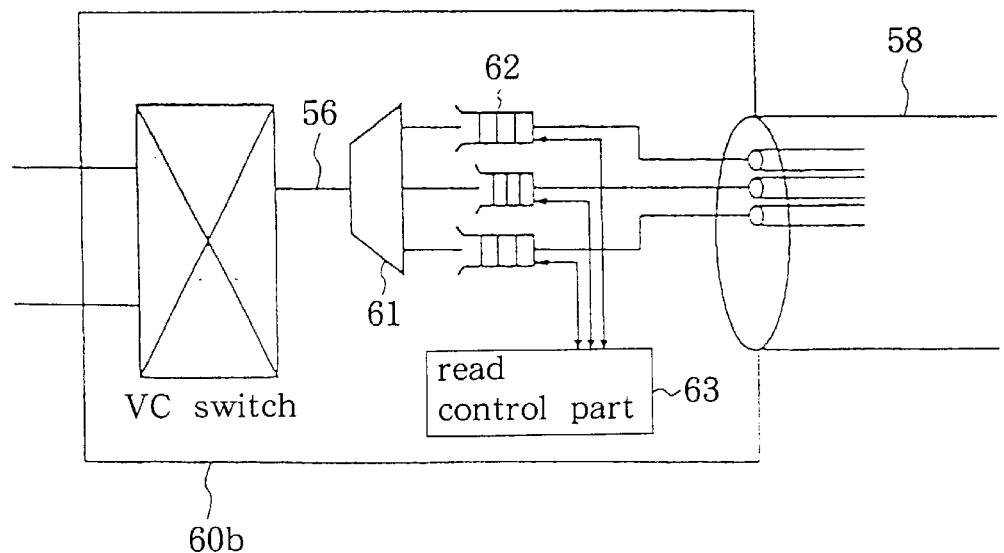
FIG. 7 shows another example of a VCH configuration.
Figure 8:
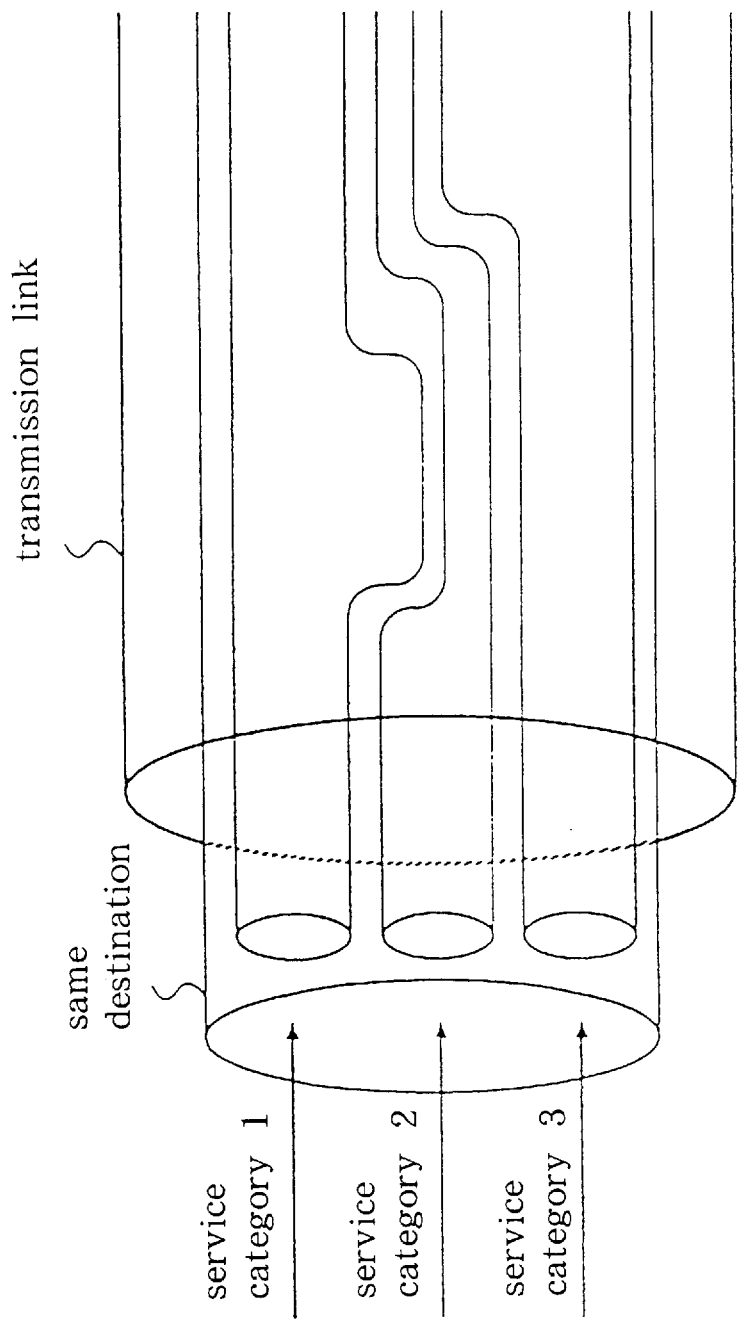
FIG. 8 explains the manner in which VPs are disposed on a transmission link.

FIG. 7 shows another example of the configuration of a VCH 60b. This VCH has, in addition to the configuration shown in FIG. 6, a read control part 63 which controls the reading of shapers 62. This read control part 63 performs read control in accordance with the priority or non-priority of each service category with the same destination. For example, when telephone traffic, which is real-time in nature, has increased, read control part 63 increases the bandwidth of the corresponding VP and makes the traffic of other categories wait, the other categories being such that waiting is permissible. The manner in which VPs are disposed on a transmission link is shown in FIG. 8.

Priority control of this sort is priority control among VPs with the same destination, and does not affect resource management in the VP network. It enables the quality of service (delay and cell loss) of a plurality of media or services to be controlled efficiently at a switch.

In the foregoing embodiment, an explanation was given of the case where an individual VP is assigned to each media, i.e., to each service category. However, a plurality of media with the same destination can also be assigned to the same VP. A VCH 60c configuration in such a case is shown in FIG. 9.

Figure 9:
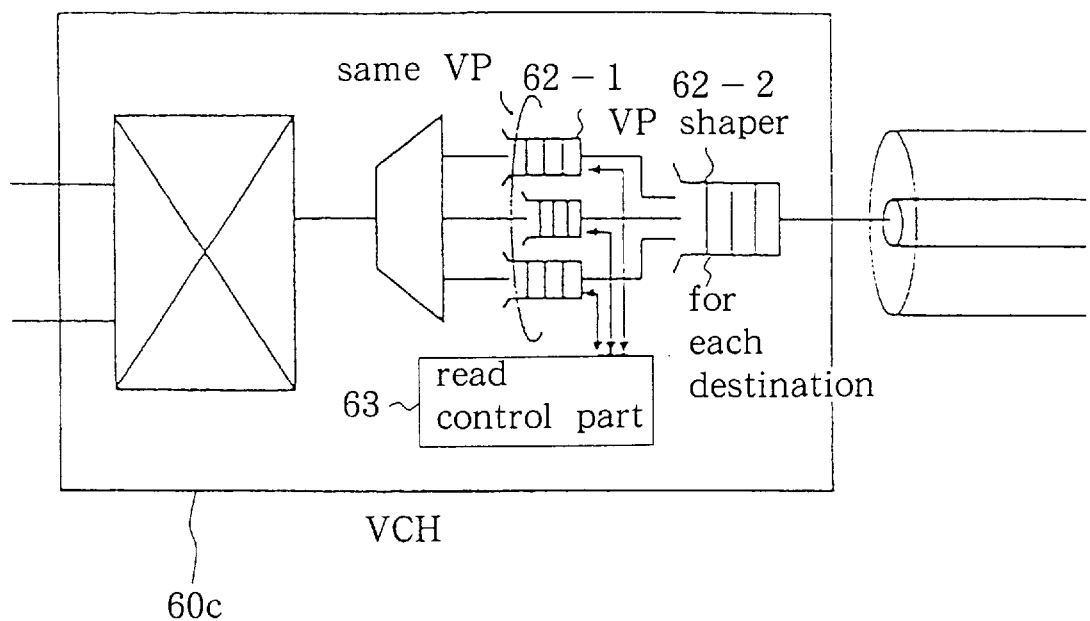
FIG. 9 shows another example of a VCH configuration.

VCH 60c shown in FIG. 9 has: a shaper 62–1 for each category; VP shaper 62–2 for each destination; and read control part 63 which controls the reading of shapers 62–1. For each category, a shaper 62–1 controls the quality of service for that category. VP shaper 62–2 sends cells that have been read from a shaper 62–1 for each category to a common VP. In this case, Category 1 may, for example, be assigned to virtual channel identifiers (VCIs) "1"–"100", while Category 2 may be assigned to VCIs "101"–"200". This results in one VP per destination at the transmission link level, which means that the number of VPs can be decreased and the communication network can be realized with smaller VPHs.

In the embodiments explained above, an ideal network topology is realized for each service or media in a single physical network. Because the quality of service can be controlled as occasion demands for each service, multimedia can be handled economically and flexibly.

Next, explanations will be given of procedures for establishing the VCH interconnection networks described above.

Figure 10:
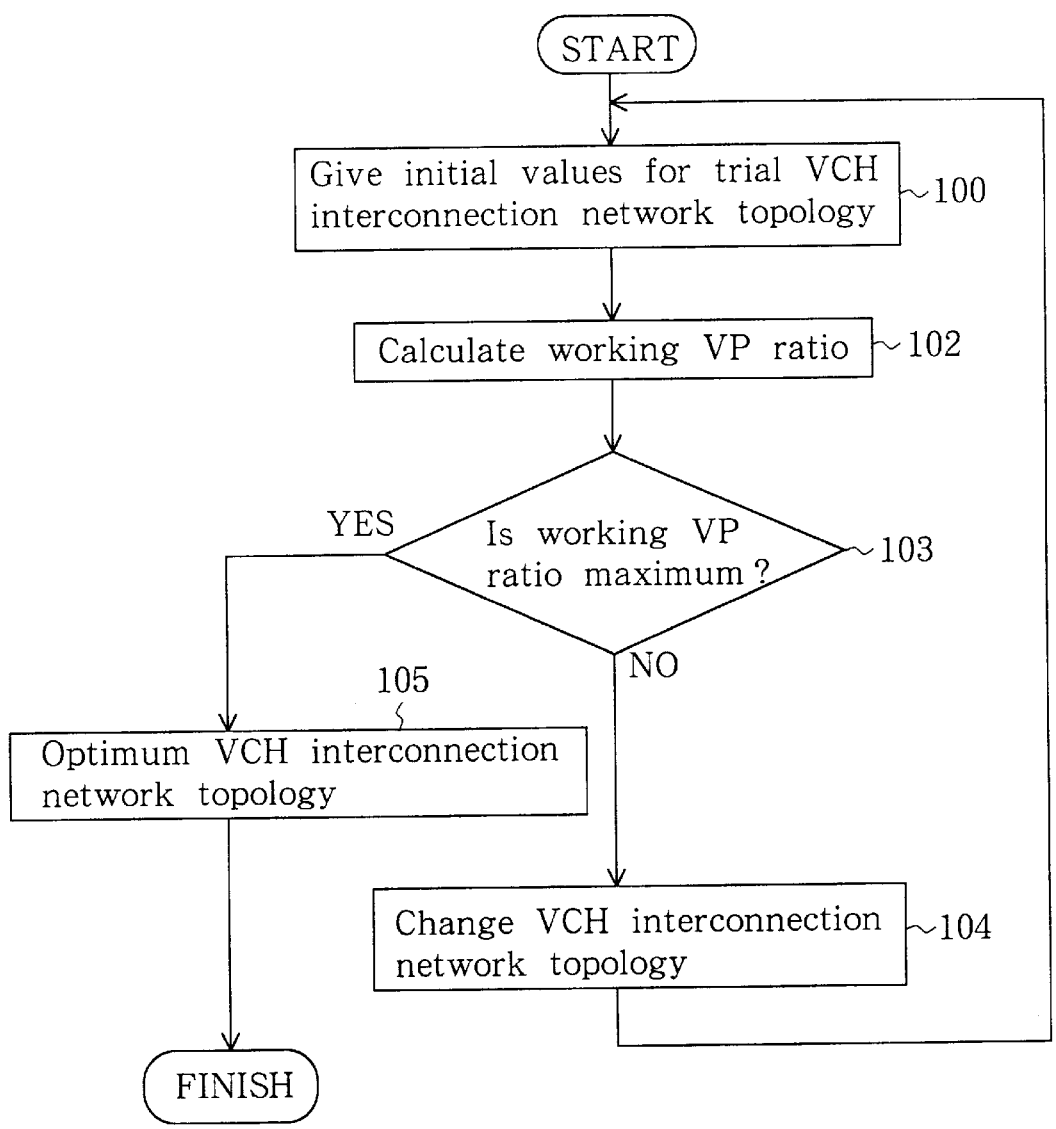
FIG. 10 is a flowchart showing a conventional method for establishing a VC network in an ATM network.

FIG. 10 shows, as an example of a method for establishing a VCH interconnection network utilizing a known method for establishing a VC network. In order to establish a VCH interconnection network, the initial values for a trial VCH interconnection network topology are first input in step 100. The quality required by the users in this example includes a relatively high degree of reliability. As an example, the network's reliability will be considered as the recovery ratio of working VPs when a fault has occurred. In an ATM network, the reliability required for each media is different. The back-up VP capacity is assigned so as to guarantee the highest required reliability, i.e., the recovery ratio of working VPs when a fault has occurred. The back-up VP capacity is set within the range of the given trial VCH interconnection network topology. In step 102, working VP ratio is defined as:

$$\frac{\text{total working } VP \text{ capacity}}{\text{total working } VP \text{ capacity} + \text{total back-up } VP \text{ capacity}}$$

The working VP ratio is thus obtained from the working VP capacity and the back-up VP capacity, which have been set so as to guarantee the required reliability. It is then decided whether the working VP ratio is at a maximum in step 103. If it is not at a maximum, the trial VCH interconnection network topology is changed in step 104 and the working VP ratio is obtained again in the same manner. If the working VP ratio is a maximum, the VCH interconnection network topology will be an optimum network topology (see step 105) and the design method is finished.

However, in an ATM network in which a plurality of media coexist, the method illustrated in FIG. 10 establishes a VCH interconnection network suited to the media which requires the highest reliability, which means that excessive network resources are given to media which do not require such reliability. In addition, VCs that handle burst type traffic and VCs that handle non-burst traffic are multiplexed onto the same VPs, and if the traffic type (i.e., whether in the form of bursts or not), VC number, required cell loss probability, etc., of VCs established between subscribers using this VCH interconnection network are not reflected in the network resource efficiency, it will be impossible to make an accurate evaluation of the network resource efficiency.

Figure 11:
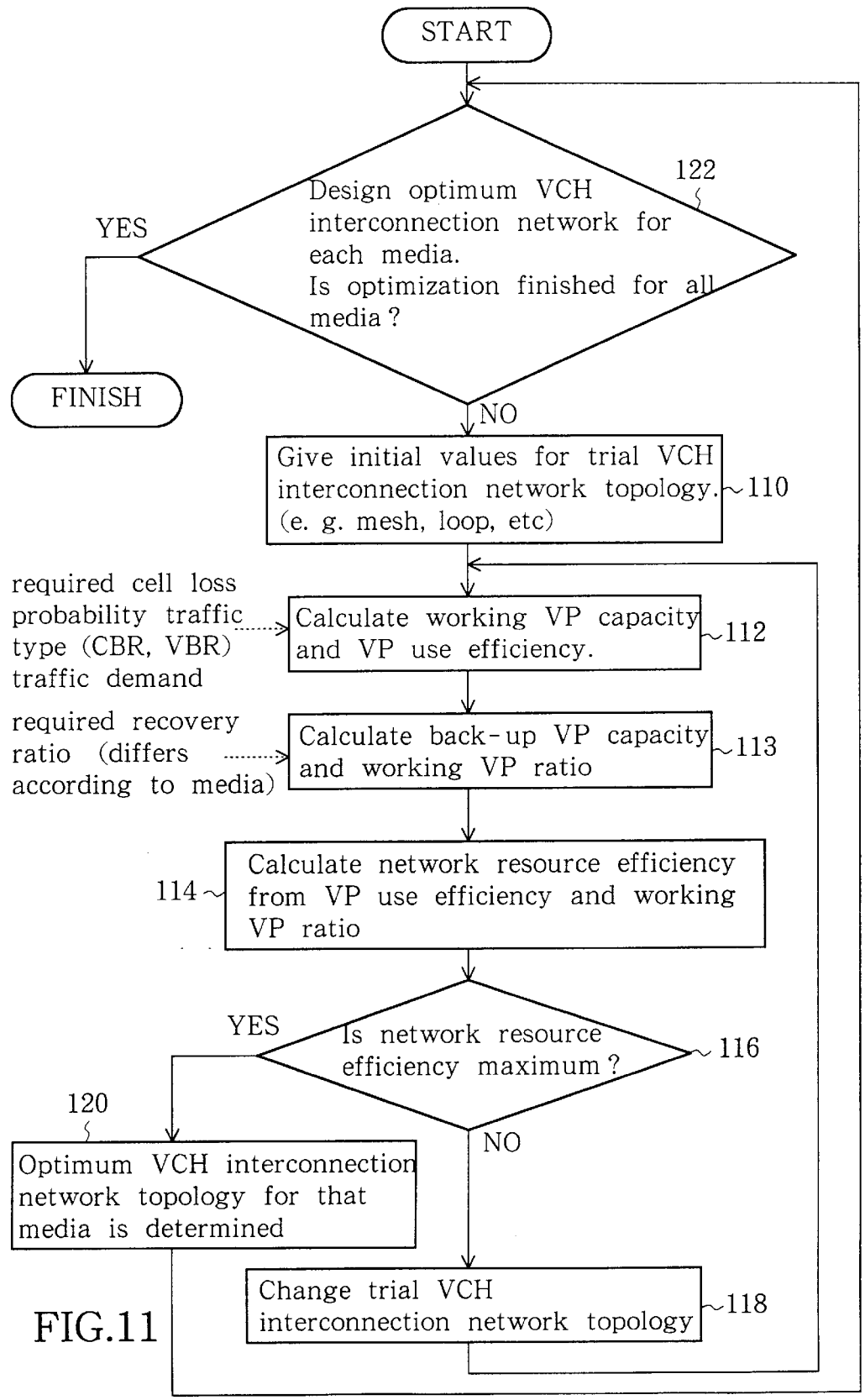
FIG. 11 is a flowchart showing a method for obtaining a different optimum VC network for each media.

FIG. 11 shows a method for obtaining a different optimum VCH interconnection network for each media, thereby overcoming these defects. In this method, a different VCH interconnection network is configured in accordance with the required quality, traffic type and traffic demand of each media, so that network resource efficiency is maximized. In establishing a VCH interconnection network for each media, network resource efficiency is calculated not just from the working VP ratio, but also from the VP use efficiency, which has been calculated from the traffic type (whether in the form of bursts or not), traffic demand (VC number) and required cell loss probability (required quality) of VCs established between subscribers on the basis of the VCH interconnection network. Network resource efficiency thus calculated is used to evaluate the optimization, and the trial VCH interconnection network topology is changed on this basis. The method illustrated in FIG. 11 can be carried out by a computer programmed to implement the processes illustrated in FIG. 11. Such a computer would include an input device for inputting initial values, a Central Processing Unit (CPU) and an output device, such as a display.

This method will now be explained in greater detail below. In the optimization of a VCH interconnection network for a given media, the initial values for a trial VCH interconnection network topology are first input in step 110, and VC routes are established for this trial VCH interconnection network topology. VC routes may be considered as taking the shortest path between origin and destination VCHs. VC routes pertaining to the same media and passing between two VCHs may be multiplexed onto the same VP. The VP capacity required for this trial connection is calculated in steps 112–114 from the traffic type (whether in the form of bursts or not), VC number and cell loss probability of the VCs; and the VP use efficiency is found at the same time. The VC number is equivalent to the traffic demand of the media, while cell loss probability is part of the quality required of the media. The use efficiency of any given VP is defined as:

$$\frac{\text{sum of mean rates of } VCs \text{ accommodated in given } VP}{\text{required } VP \text{ capacity}}$$

When considered in terms of the whole network, the overall VP use efficiency will be:

$$\frac{\Sigma(\text{sum of mean rates of } VCs \text{ accommodated in a } VP)}{\Sigma \text{ required } VP \text{ capacity}}$$

where Σ indicates the sum total for all the VPs. When the reliability required of a media is considered as the recovery ratio in the event of a fault in a VP, the back-up VP capacity is set so as to be sufficient to guarantee the required recovery ratio in an alternative path, in order to achieve recovery between faulty VP terminals. An alternative path may, for example, be considered as being the shortest path within the limits of the given VCH interconnection network topology.

The working VP ratio is defined as:

$$\frac{\text{total working } VP \text{ capacity}}{\text{total working } VP \text{ capacity} + \text{total back-up } VP \text{ capacity}}$$

which expresses the state of utilization of network resources. In step 116, it is decided whether this network resource efficiency is at a maximum, and if it is not at a maximum, the trial VCH interconnection network topology is changed in step 118 and the same process is repeated. If the network resource efficiency is at a maximum, the given VCH interconnection network topology becomes the optimum network topology for that media. See step 120. Optimization of a VCH interconnection network for a new media is begun if in step 122, it is determined that optimization is not complete for all media and the same process is performed until it is determined in step 122 that optimization of VCH interconnection networks is completed for all media.

Thus, because a different VCH interconnection network for each media is optimized, the VCH interconnection networks are not all designed to suit the media that requires the highest quality (reliability and cell loss probability), and excess network resources are not given to media that do not require such high quality. Moreover, network resource efficiency is calculated not just from the working VP ratio, but also from the VP use efficiency as calculated from the traffic type (whether in the form of bursts or not), traffic demand (VC number) and required cell loss probability of VCs established between subscribers utilizing these VCH interconnection networks. As a result, VCH interconnection networks can be optimized in correspondence with required quality, traffic type and traffic demand, which differ for different media.

Figure 12:
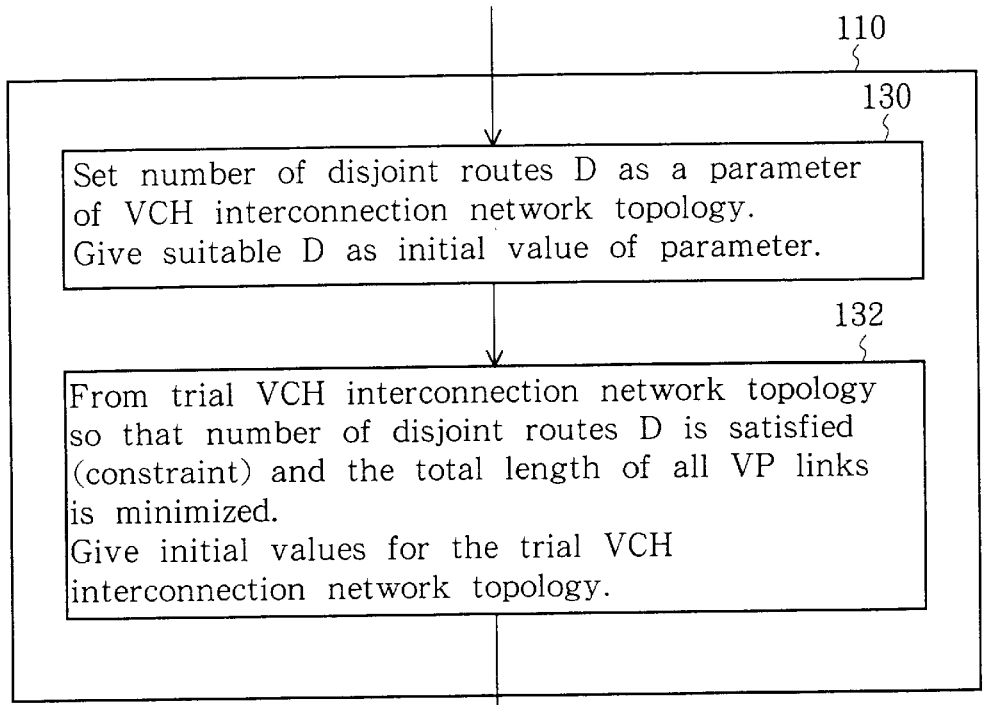
FIG. 12 is a flowchart showing an example of a method for forming a trial VCH interconnection network topology.
Figure 13:
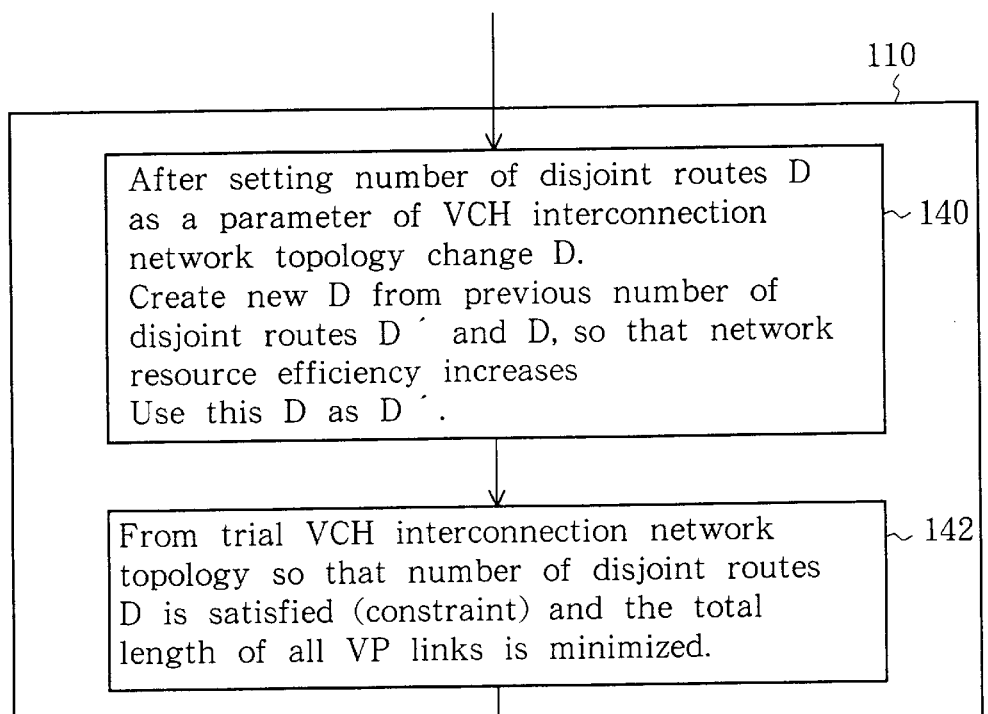
FIG. 13 is a flowchart showing an example of a method for changing the trial VCH interconnection network topology.

FIG. 12 and FIG. 13 show examples of how a trial VCH interconnection network topology is formed in step 110 of FIG. 11 so that network resource efficiency can be calculated. FIGS. 14(a)–(d) show trial network topologies when the number of disjoint routes D has been set as a parameter. The number of disjoint routes D between VCHs is set as a parameter when the initial values for a trial VCH interconnection network topology are given or when a trial VCH interconnection network topology is changed. The number of disjoint routes between VCHs is the number of paths between origin and destination VCHs which do not pass through the same VCH or VP link. In the present case, the number of disjoint routes will be considered to be the same between all VCHs.

In the method shown in FIG. 12, a given number of disjoint routes D is set as a parameter of trial VCH interconnection network topology in step 130, and satisfying this number of disjoint routes D will be taken as a constraint. In step 132, initial values for a trial VCH interconnection network topology are formed so that the total length of all the VP links is minimized. The network resource efficiency of the trial VCH interconnection network topology obtained is calculated using the method described above. When the trial VCH interconnection network topology is changed, the number of disjoint routes D is also changed, as shown in steps 140 and 142 in FIG. 13.

By thus setting the number of disjoint routes D as a constraint, the number of possible trial VCH interconnection network topologies is reduced, so that optimization of VCH interconnection networks can be sped up.

Figure 15:
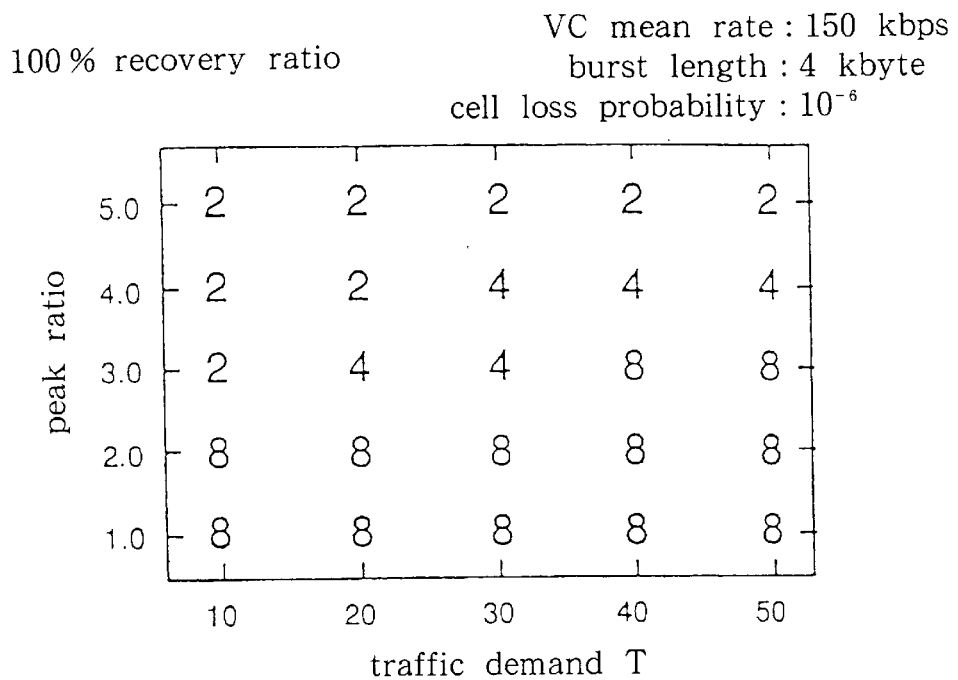
FIG. 15 shows an example of results from an optimization of VCH interconnection network topology.
Figure 16:
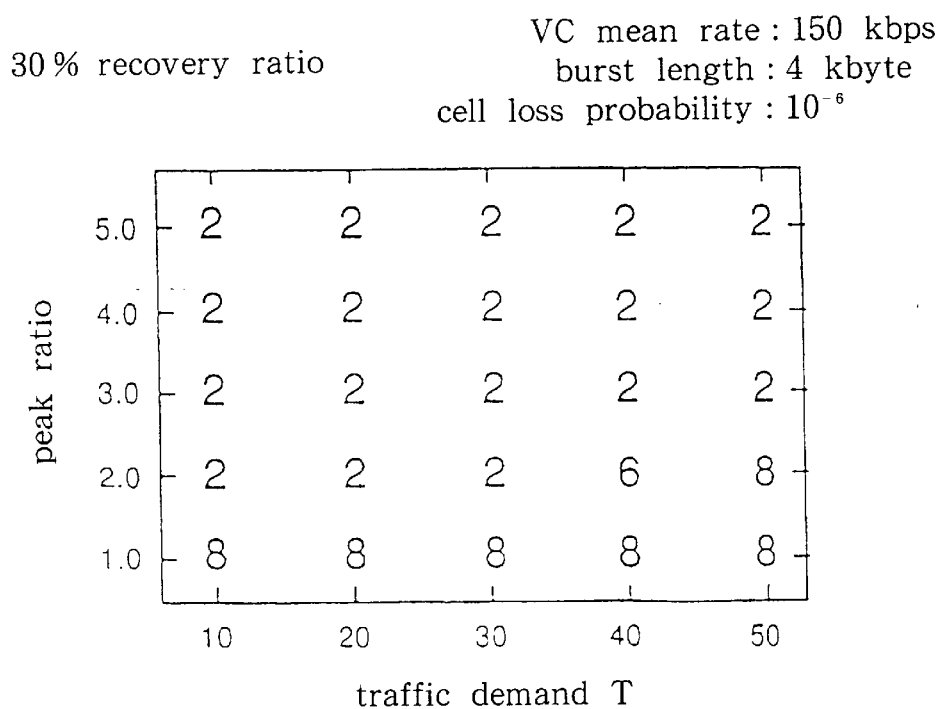
FIG. 16 shows another example of results from an optimization of VCH interconnection network topology.

FIG. 15 and FIG. 16 show the results of optimizations of VCH interconnection network topologies in which the number of disjoint routes D is set as a parameter of VCH interconnection network topology, and network resource efficiency is maximized. FIG. 15 shows the optimum number of disjoint routes for guaranteeing a 100% recovery ratio, while FIG. 16 shows the optimum number of disjoint routes for guaranteeing a 30% recovery ratio. It is assumed in both cases that VC mean rate is 150 kbps, burst length is 4 kbyte, and cell loss probability is $10^{-6}$. The horizontal axis represents traffic demand T, while the vertical axis represents peak ratio=VC peak rate/VC mean rate. The number and arrangement of VCHs was as in the network models illustrated in FIGS. 14(a)–14(d). Traffic demand T was defined as the number of VCs required between origin and destination VCHs, and it was assumed that the number of VCs required was the same between all origin and destination VCHs.

As has been explained above, by optimizing a different VCH interconnection network for each media, the VCH interconnection networks are not all designed to suit the media that requires the highest quality (reliability and cell loss probability), and excess network resources are not given to media that do not require such high quality. Moreover, network resource efficiency is calculated not just from the working VP ratio, but also from the VP use efficiency as calculated from the traffic type, traffic demand and required cell loss probability of VCs established between subscribers utilizing these VCH interconnection networks. As a result, VCH interconnection networks can be optimized in correspondence with required quality, traffic type and traffic demand, which differ for different media. In addition, by setting the number of disjoint routes D as a constraint, the number of possible trial VCH interconnection network topologies is reduced, so that optimization of VCH interconnection networks can be speeded up.

Thus far, explanations have been given of methods for maximizing network resource efficiency in terms of VPs. However, it is also feasible to design VCH interconnection networks so as to minimize the network cost of all elements that are required for establishing VCH interconnection networks, i.e., of all elements, including VCHs and VCH interconnections, that are used in establishing individual VCs. Methods for accomplishing this will now be explained.

Figure 17:
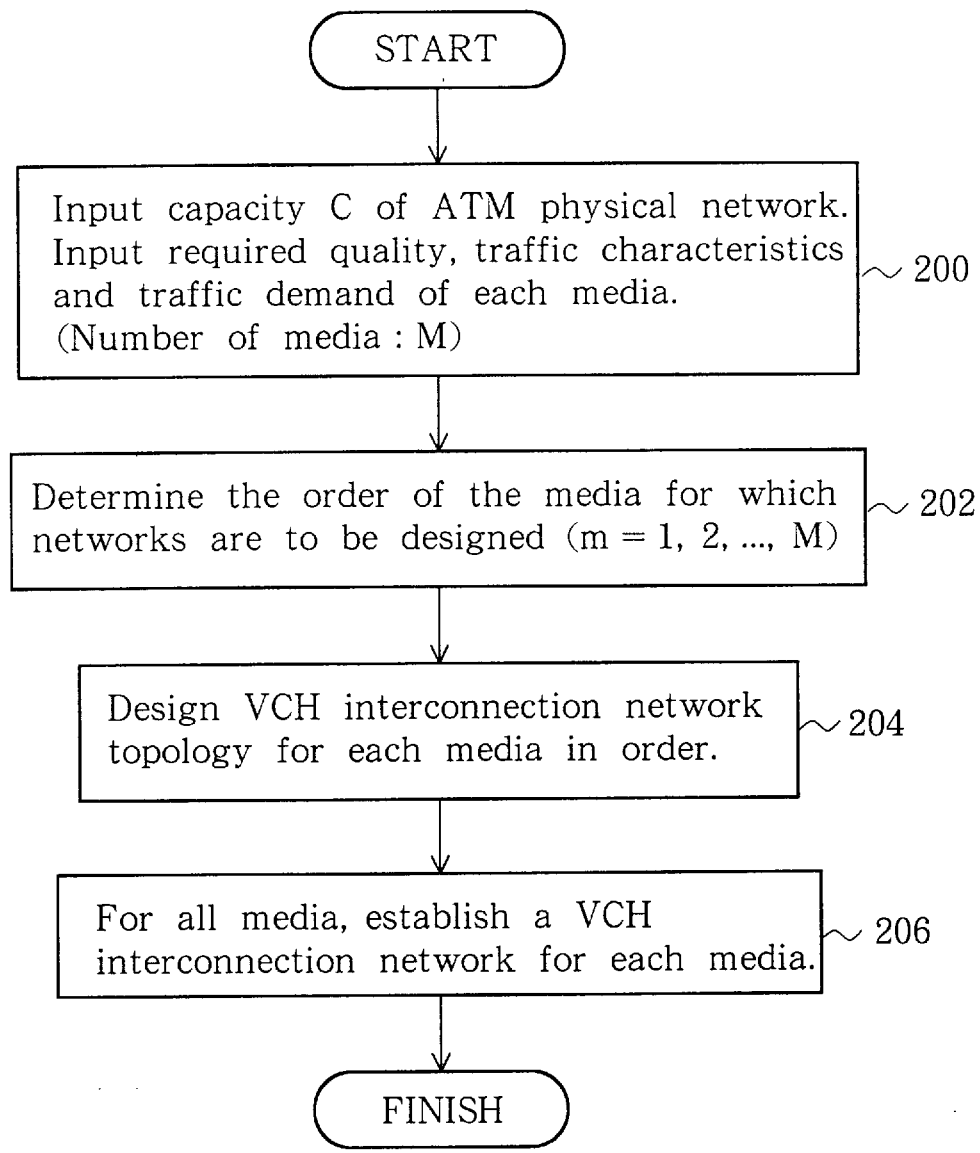
FIG. 17 shows the overall flow of a method for establishing a plurality of VCH interconnection networks that minimize cost.
Figure 18:
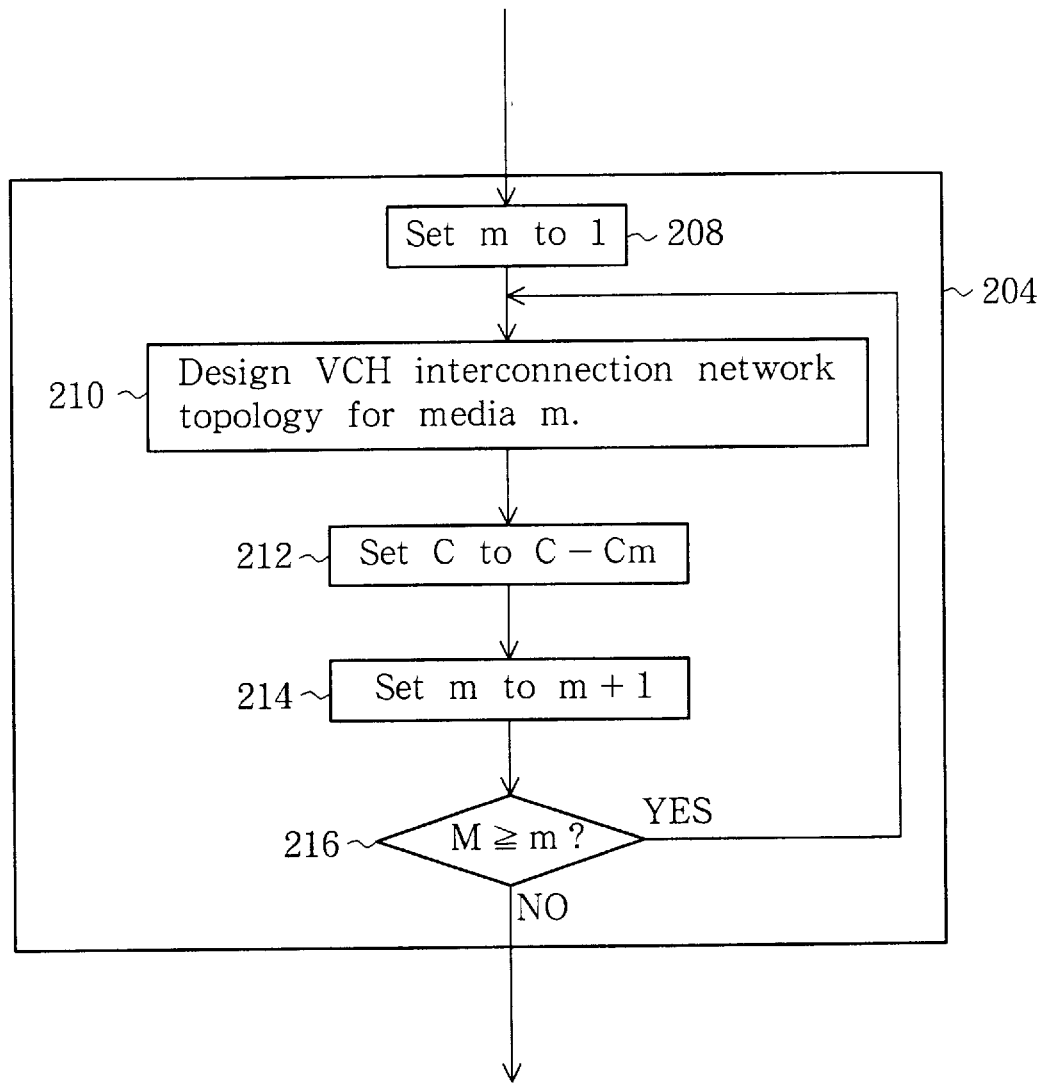
FIG. 18 shows the design flow of each VCH interconnection network topology.
Figure 19:
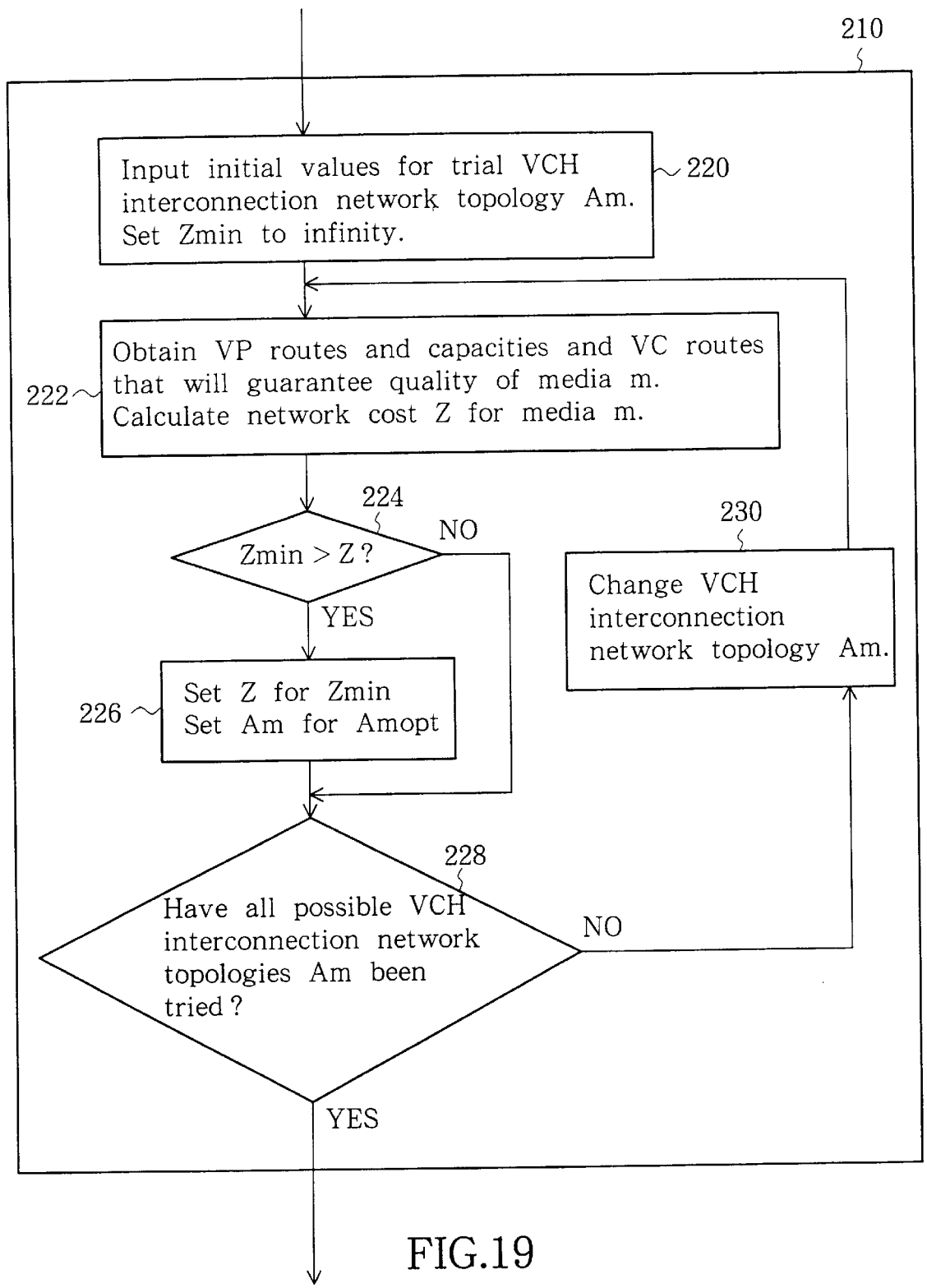
FIG. 19 shows the design flow of a VCH interconnection network topology for one given media.

FIG. 17 shows the overall flow of a method for establishing a plurality of VCH interconnection networks that minimize network cost. FIG. 18 shows the design flow of each VCH interconnection network topology. FIG. 19 shows the design flow of a VCH interconnection network topology for one given media. The processes illustrated in these Figures can be implemented on an appropriately programmed computer.

A method for designing VCH interconnection network topologies for a plurality of media will be explained with reference to FIG. 17. First; the capacity C (a vector quantity) of the ATM physical network is input to operation system OpS in step 200. This capacity C includes information regarding the capacity of each VCH and each VPH, the capacity of each transmission link, and so forth. When there are M media, the characteristics of each of these M media are input to the OpS. Specifically, items thus input include the required quality (call blocking probability, cell loss probability, delay), traffic characteristics (VBR or CBR), traffic demand (geographical distribution of traffic), and so forth. Next, the order of the media for which VCH interconnection network topologies are to be designed is determined is step 202. This order can be determined randomly. Alternatively, the order can be determined in the probable order of decreasing proportion of overall network cost accounted for by the media in question. A media which comes $m^{th}$ in this order will hereinafter be termed "media m".

A VCH interconnection network topology is then designed using a computer, for example, for each media in accordance with the determined order step 204. This design procedure will be explained with reference to FIG. 18. First, m is initialized to "1" in step 208. Next, the capacity C of the physical network and the quality required for media m are set as constraints, and a VCH interconnection network topology for media m is designed so that network cost of media m is minimized in step 210. When a VCH interconnection network topology for media m is designed, capacity $C_m$ (a vector quantity) exhibited by media m in the ATM physical network can be obtained. This capacity $C_m$ includes the capacity of transmission links, VCHs and VPHs, etc. occupied by media m. Next, in step 212, $C_m$ is subtracted from capacity C of the physical network and this is taken as the new C. This altered C becomes a constraint of the physical network when a VCH interconnection network topology is designed for the next media. After m has been increased by 1 in step 214, if m is less than or equal to the number of media M as determined in step 216, that VCH interconnection network topology is designed. The remaining capacity C of the physical network (i.e., excluding use of previously established media) is set as a constraint, and a VCH interconnection network topology is designed for the next media m in the order.

If this processing is repeated until m becomes larger than M, the design of all the VCH interconnection network topologies will be finished. This means that VCH interconnection network topologies have been respectively obtained for all the M media, as shown in FIG. 17. VCH interconnection networks are then established on the VP network in accordance with these topologies in step 206.

An example of a method for designing a VCH interconnection network topology for media m in step 210 of FIG. 18 will be explained with reference to FIG. 19. First, the initial values for the trial VCH interconnection network topology $A_m$ for media m are input in step 220. A VCH interconnection network topology can be expressed, for example, by an adjacency matrix A, where A is an N×N matrix and N is the number of VCHs. The (i,j) element of A, $a_{ij}$, is defined as $a_{ij}=1$ if there is a VP connection from VCHi to VCHj, and as $a_{ij}=0$ if there is no VP connection from VCHi to VCHj. Adjacency matrix A is generally taken as a variable when a VCH interconnection network is established, and the VCH interconnection network topology is determined on this basis. The minimum network cost $Z_{min}$ is initialized as infinity.

Next, in step 222, VP routes and capacities and VC routes that will guarantee the quality required of media m (e.g., call blocking probability, cell loss probability, and delay) and result in lower network cost are obtained, and network cost Z for media m is calculated. It is assumed that a VP is established only when a VP connection between VCHs has been established in the aforementioned VCH interconnection network topology $A_m$ (i.e., only when $a_{ij}=1$). It is also assumed that the system in use is the one where VCs belonging to different media are accommodated in separate VPs. Accordingly, when considering the accommodation of VCs pertaining to a given media in a VP, no account has to be taken of VCs of other media accommodated in the same VP. There may be one or more than one VP between VCHs. The VC routes are selected within the limits of the VP connections represented by the given VCH interconnection network topology. The network cost Z for media m may comprise the sum of value $Z_1$, which is calculated from the quantity of facilities used in the ATM physical network for media m, and a penalty function $Z_2$. In other words, $Z=Z_1+Z_2$.

Specifically, the "quantity of facilities used in the ATM physical network for media m" means the quantity of facilities used for transmission links, VCHs and VPHs. The penalty function is formulated so that it is "0" when the constraints on physical network capacity and required quality are met, and so that its value $Z_2$ increases in correspondence with the degree to which these constraints are not met. Although the value of $Z_2$ may become larger than "0" during the process whereby the design of VCH interconnection network topology is optimized, $Z_2$ has to become "0" at the point in time when the optimization process is finished.

Next, it is decided in step 224 whether the value of Z obtained in the manner described above is smaller than $Z_{min}$. If it is, the value of Z is substituted for $Z_{min}$, and $A_m$ is substituted for $A_{mopt}$ in step 226. Processing then proceeds to step 228. If Z is not smaller than $Z_{min}$, processing proceeds to step 228 without changing the values of $Z_{min}$ and $A_{mopt}$. In step 228, it is decided whether all possible VCH interconnection network topologies $A_m$ have been tried. If so, the design of a VCH interconnection network topology for media m is terminated and processing returns to the steps shown in FIG. 18. However, if this is not so, VCH interconnection network topology $A_m$ is changed in step 230 and the processing described above is repeated.

By designing VCH interconnection network topologies after determining the order of the media, VCH interconnection networks that are suited to the characteristics of the media can be established and efficient use can be made of network resources.

Figure 20:
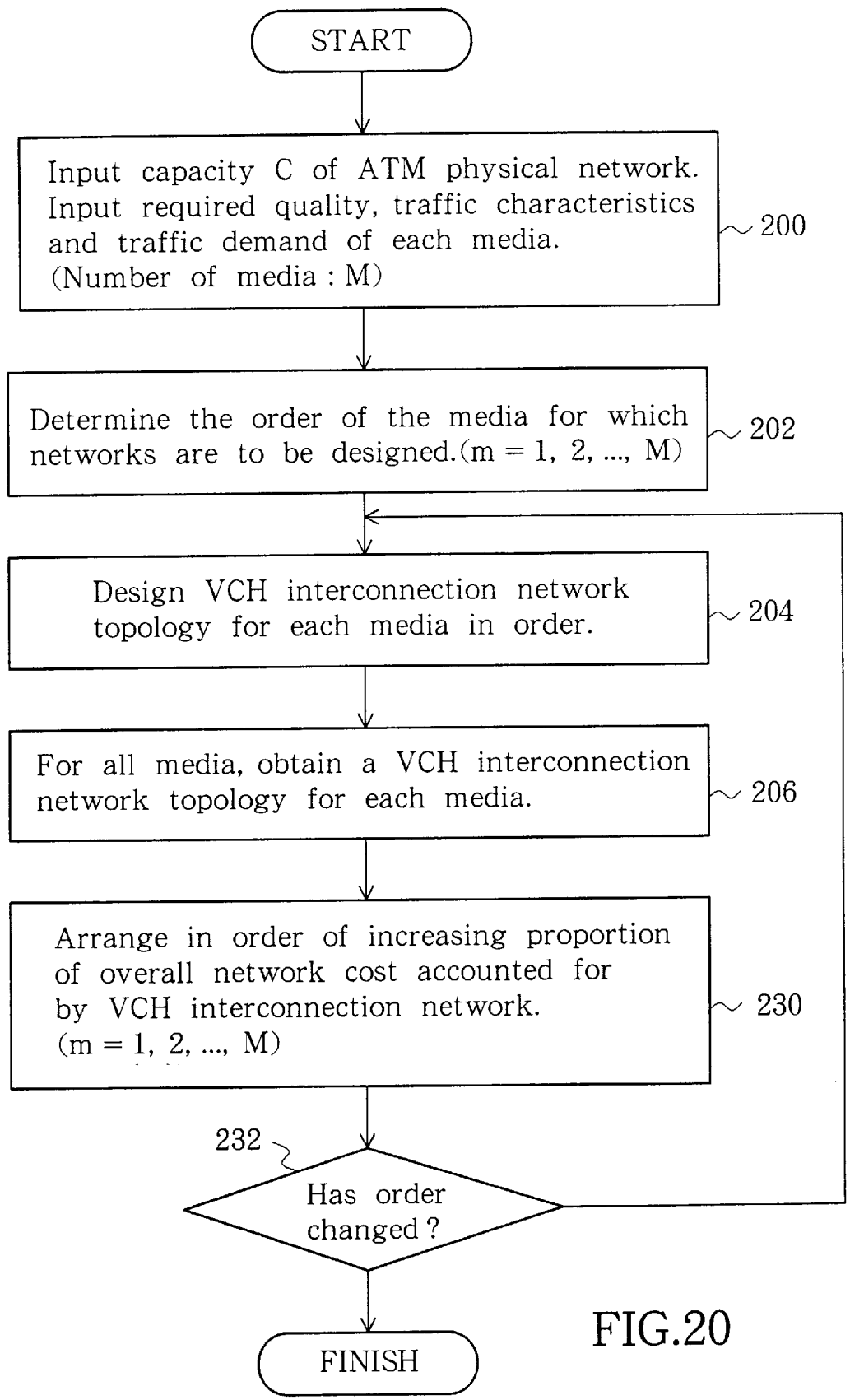
FIG. 20 is a flowchart showing a method for designing a VCH interconnection network topology for each media after setting the design priority order of the VCH interconnection networks in the order of decreasing network cost.

FIG. 20 is a flowchart capable of being computer implemented showing a method for designing a VCH interconnection network topology for each media after setting a design priority order for the VCH interconnection networks in the order of decreasing network cost.

The steps beginning with the input of ATM physical network capacity C (step 200) to obtaining a VCH interconnection network topology for each media (step 206) are the same as in the method illustrated in FIG.. 17. At this point, the network cost of each VCH interconnection network and the overall network cost are known. The media are, therefore, arranged in the order of decreasing proportion of overall network cost accounted for by the VCH interconnection network cost of each media in step 230. It is then decided in step 232 whether the order has changed as a result of this rearrangement. If it has, the design of a VCH interconnection network topology for each media is repeated. If the order has not changed, this means that the order of the media has converged and that the desired VCH interconnection network topology for each media has been obtained.

Because the method illustrated in FIG. 20 arranges the design order in the order of decreasing proportion of overall network cost accounted for by the VCH interconnection network cost of each media, and designs a VCH interconnection network topology for each media in accordance with this order, it can give priority to establishing VCH interconnection networks for media that have a greater effect on overall network cost. This method can therefore reduce overall network cost and establish VCH interconnection networks that are suited to media characteristics, thereby making efficient use of network resources.

Figure 21:
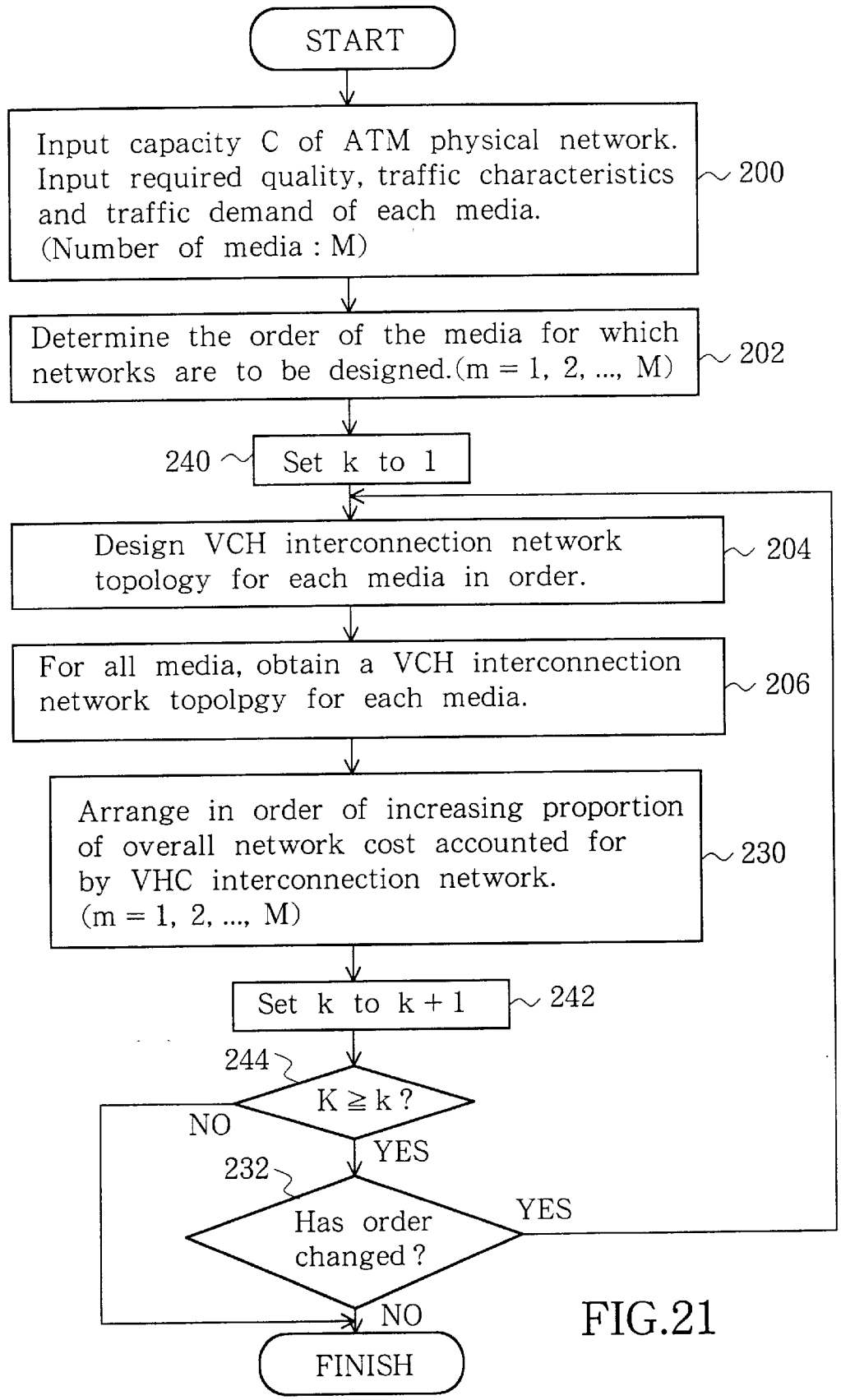
FIG. 21 is a flowchart showing another method for designing a VCH interconnection network topology for each media.

FIG. 21 is a flowchart capable of being computer-implemented showing another method for designing VCH interconnection network topologies for each media. This method differs from the method shown in FIG. 20 in that a limit is imposed on the number of times the order can be changed. Namely, the number of times that VCH interconnection network topologies are designed in a particular order is restricted beforehand to K. After an initial order has been set in steps 200 and 202, a count is initialized to k=1 in step 240, whereupon the value of k is increased by 1 in step 242 each time the order is rearranged. It is then decided whether K≧k. If, in step 244 this is so, the processing shifts to the decision regarding whether the order has changed. If not, it is decided that the design of a VCH interconnection network topology for each media is finished and processing is terminated.

The number of times that the design of a VCH interconnection network topology for each media is repeated is thus predetermined, and even if the order has changed, if this number of times is exceeded, it is decided that the design of a VCH interconnection network topology for each media is finished, whereupon processing is terminated. Because a restriction is imposed on the calculation time spent designing the VCH interconnection network topologies, the communication network can be established more efficiently.

Figure 22:
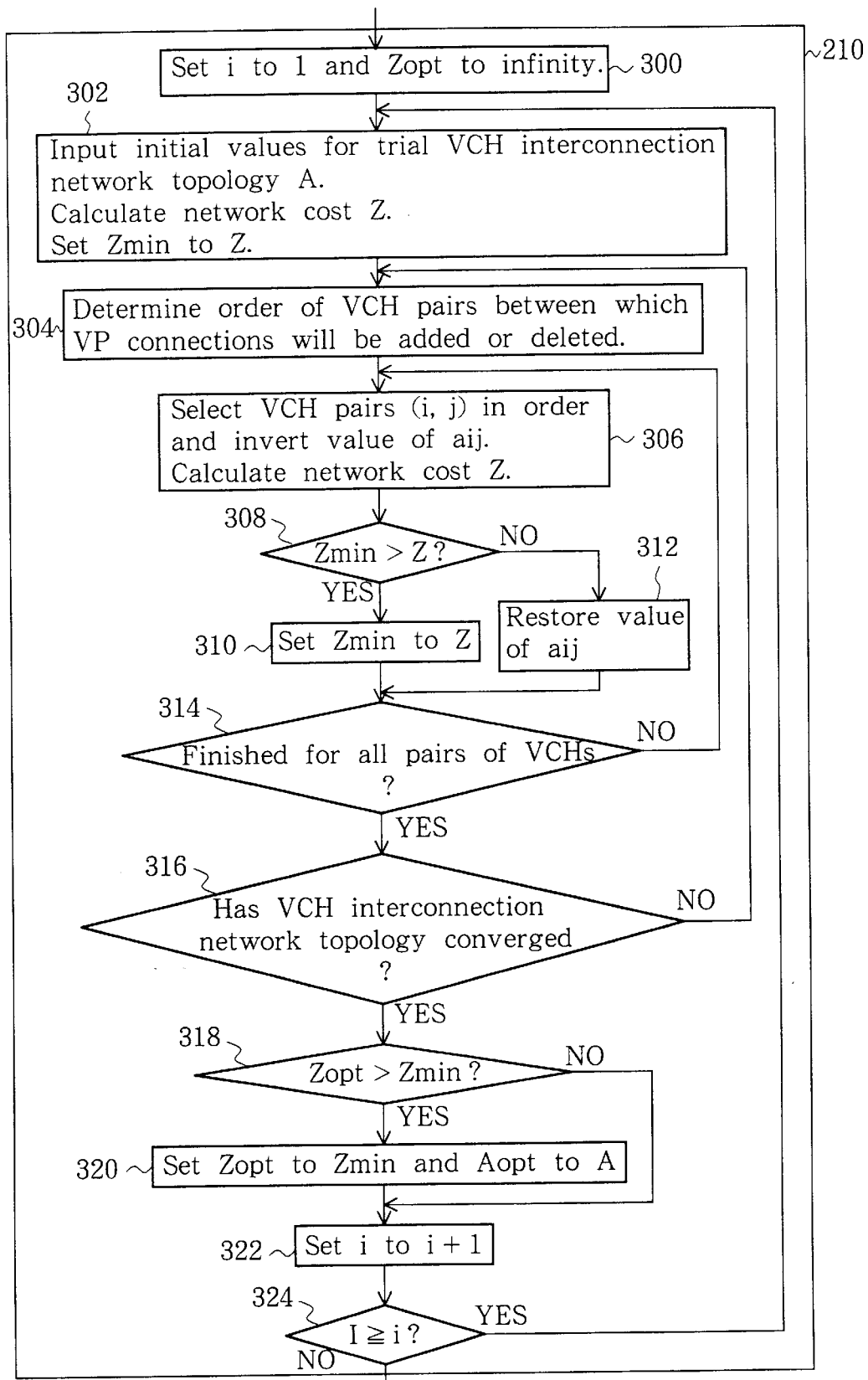
FIG. 22 shows another example of a method for designing a VCH interconnection network topology for a particular media.

FIG. 22 shows a method used for step 210 of FIG. 18 for designing a VCH interconnection network topology for media m which differs from the design method illustrated in FIG. 19. According to this method, an optimal solution for a VCH interconnection network is found using I trial VCH interconnection network topologies. In the subsequent explanation, the subscript will be omitted from the symbol $A_m$ which indicates the VCH interconnection network topology for the $m^{th}$ media.

First, the number of repetitions i of the trial VCH interconnection network topology is set to "1" and $Z_{opt}$ is set to infinity in step 300. Initial values for the trial VCH interconnection network topology A for media m are input as the initial topology in step 302. VP routes and capacities and VC routes that will guarantee the quality required of media m (e.g., call blocking probability, cell loss probability, and delay) and result in lower network cost are obtained, and network cost Z for media m are calculated in step 302. The methods used for establishing VP routes and capacities and VC routes, as well as for calculating network cost Z, are the same as those explained with reference to FIG. 19. The value of Z obtained is substituted for $Z_{min}$. A VCH interconnection network topology can be expressed, for example, by an adjacency matrix A, where A is an N×N matrix, and N is the number of VCHs. The (i,j) element of A, $a_{ij}$, is defined as $a_{ij}=1$ if there is a VP connection from VCHi to VCHj, and as $a_{ij}=0$ if there is no VP connection from VCHi to VCHj. Adjacency matrix A is generally taken as a variable when a VCH interconnection network is established, and the VCH interconnection network topology is determined on this basis.

By repeatedly adding and deleting VP connections between VCHs, the method illustrated in FIG. 22 optimizes VCH interconnection network topology so that network cost for media m is minimized.

To achieve this, first an order is determined in step 304 for pairs of VCHs between which VP connections are to be added or deleted. This order can be determined for example by arranging the VCH pairs randomly. VCH pairs (i,j) are then selected in accordance with the order thereby determined, and the value of $a_{ij}$ is inverted. In other words, if $a_{ij}=1$ it is changed to "0", while if $a_{ij}=0$ it is changed to "1". VP routes and capacities and VC routes that will guarantee the quality required of media m (e.g., call blocking probability, cell loss probability, and delay) and result in lower network cost are obtained for the altered VCH interconnection network topology, and network cost Z for media m is calculated in step 306. It is then decided in step 308 whether $Z_{min}>Z$. If so, the value of Z is substituted for $Z_{min}$ in step 310. This signifies that it is possible that the VCH interconnection network topology at that point in time will become an optimal solution. If $Z_{min}$ is not greater than Z, the value of $a_{ij}$ is restored to its previous value in step 312. It is then decided in step 314 whether the foregoing processing has been performed for all VCH pairs. If it has, processing proceeds to step 316. If not, the processing returns to the calculation of network cost Z step 306, and the same processing is performed on the next VCH pair (i,j) in the order. When the foregoing processing has been performed on all VCH pairs, it is decided in step 316 whether the VCH interconnection network topology has converged. Convergence of a VCH interconnection network topology means that there is no change, at the point in time of this convergence decision, in the previous VCH interconnection network topology for which the order of the VCH pairs is determined. If it is decided that the VCH interconnection network topology has not converged, processing returns to step 304. If it is decided that the VCH interconnection network topology has converged, it is then decided in step 318 whether $Z_{opt}>Z_{min}$. If so, $Z_{opt}$ and $A_{opt}$ are updated with the values of $Z_{min}$ and A, respectively in step 320. The value of i is increased by 1 in step 322 and it is decided whether I≧i in step 324. If so, processing returns to step 302. If it is not so, this processing is terminated.

By adding or deleting VP connections for I trial VCH interconnection network topologies, the method illustrated in FIG. 22 enables an optimal solution for VCH interconnection network topology to be obtained efficiently.

Figure 23:
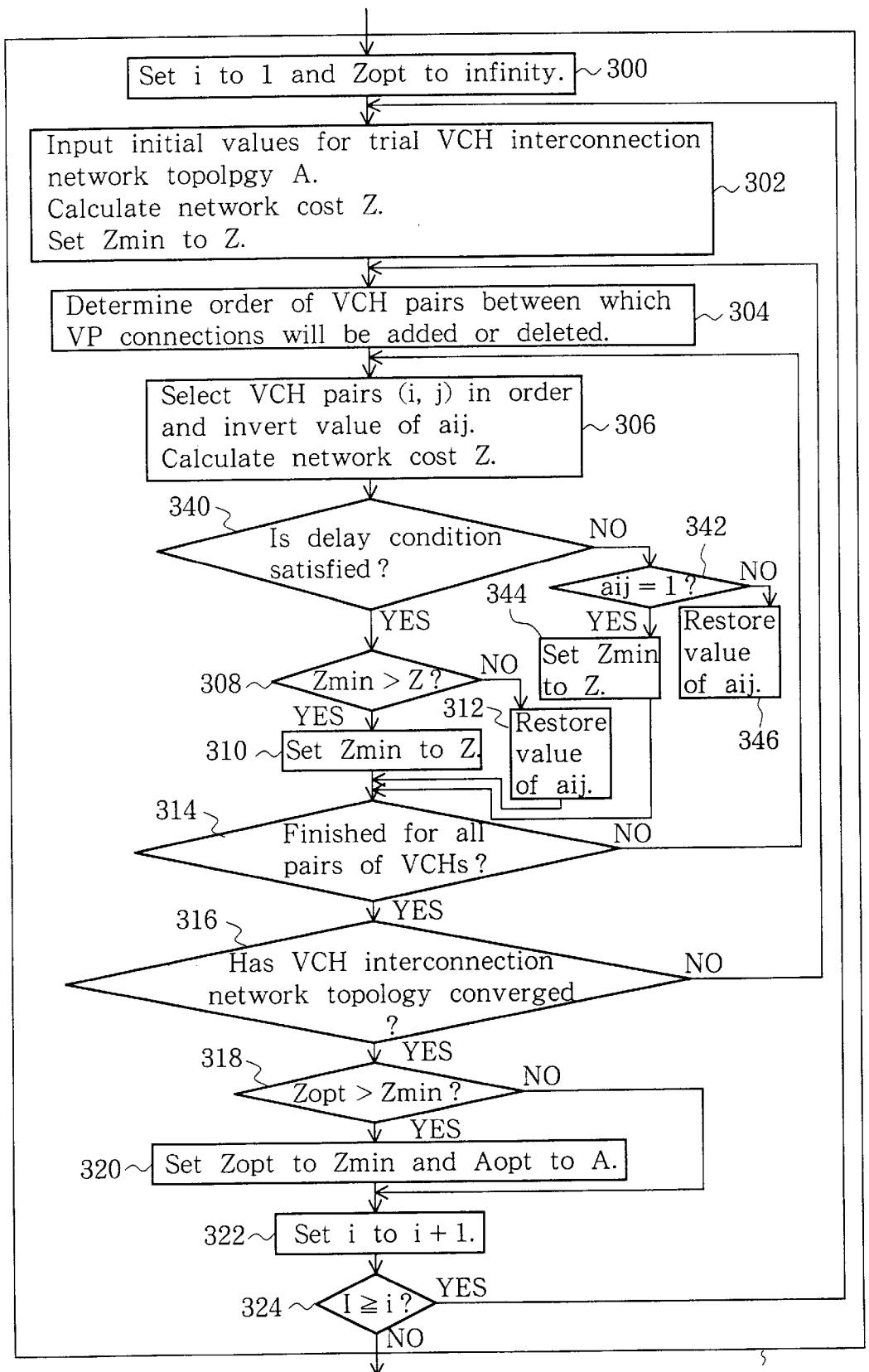
FIG. 23 shows still another method for designing VCH interconnection network topologies.

FIG. 23 shows still another method used in step 210 of FIG. 18 for designing VCH interconnection network topologies. This method differs from the method illustrated in FIG. 22 in that it performs a decision and related processing regarding a delay condition.

Namely, after network cost Z has been calculated in step 304, it is decided whether a delay condition is satisfied in step 340. In the method shown in FIG. 19 or the method shown in FIG. 22, failure to meet the delay conditions was reflected in the value of a penalty function $Z_2$. In the method shown in FIG. 23, in addition to providing a penalty function, delay is reduced by establishing a VP between VCHs which are not directly connected by a VP.

In other words, when the delay condition is not satisfied, it is decided in step 342 whether $a_{ij}=1$. If $a_{ij}=1$, the value $Z_{min}$ is updated to Z in step 344, irrespective of the value of the network cost. If $a_{ij}$ is not equal to 1, the value of $a_{ij}$ is restored and $a_{ij}$ is set to 1 in step 346. If $a_{ij}=1$, it signifies that a VP has been established between VCHi and VCHj, and because there is no intermediary VCH, delay can be reduced.

By incorporating a decision and related processing regarding a delay condition into the algorithm for optimizing VCH interconnection network topology, an optimal solution for VCH interconnection network topology can be obtained efficiently.

Explanations have been given, with reference to FIG. 17–FIG. 23, of methods for designing a plurality of VCH interconnection network topologies in an order that will minimize network cost. As opposed to this, it is also feasible to design a plurality of VCH interconnection network topologies simultaneously. Such methods will be explained below.

Figure 24:
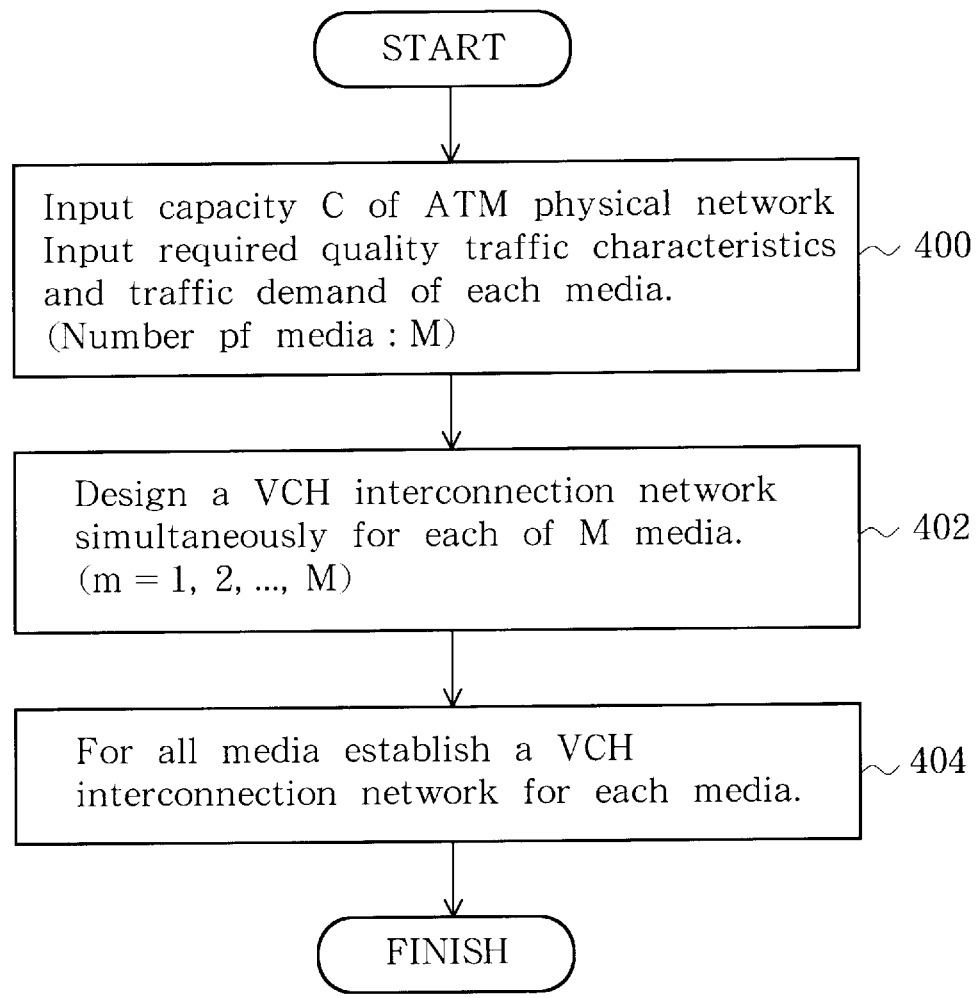
FIG. 24 shows a method for simultaneously designing VCH interconnection network topologies for a plurality of media.

FIG. 24 shows a method for designing VCH interconnection network topologies simultaneously for a plurality of media. This method is also capable of being implemented on a computer. In this method, capacity C (a vector quantity) of the ATM physical network is first input to operation system OpS in step 400. Capacity C includes information regarding the capacity of each VCH, the capacity of each transmission link, and so forth. When there are M media, the characteristics of each of these M media are input to the OpS. Specifically, items thus input include the required quality (call blocking probability, cell loss probability, delay), traffic characteristics (VBR or CBR), traffic demand (geographical distribution of traffic), and so forth.

Next, rather than designing the VCH interconnection network topologies for each of the M media in a particular order, they are designed simultaneously in step 402. An example of this design method in step 402 will be explained with reference to FIG. 25.

First, the number of repetitions i of the trial VCH interconnection network topology is set to "1", and $Z_{opt}$ is set to infinity in step 410. For all m (m=1, 2, . . . , M), initial values for the trial VCH interconnection network topology A for media m are input as the initial topology in step 412. Next, for all m, VP routes and capacities and VC routes are also obtained in step 412 that will guarantee the quality required of media m (e.g., call blocking probability, cell loss probability, and delay) and result in a smaller sum total of the VCH interconnection network costs arising from each media, i.e., in lower overall network cost. Overall network cost Z is then calculated. VP routes and capacities and VC routes, and overall network cost Z, are obtained by applying the methods explained with reference to FIG. 19 to all media in succession. The value of Z obtained is substituted for $Z_{min}$. A VCH interconnection network topology can be expressed by an N×N matrix (where N is the number of VCHs). In the present case, a VCH interconnection network topology for media m will be represented by adjacency matrix Am. The (i,j) element of Am, $am_{ij}$, is defined as $am_{ij}=1$ if there is a VP connection from VCHi to VCHj, and as $am_{ij}=0$ if there is no VP connection from VCHi to VCHj.

Figure 25:
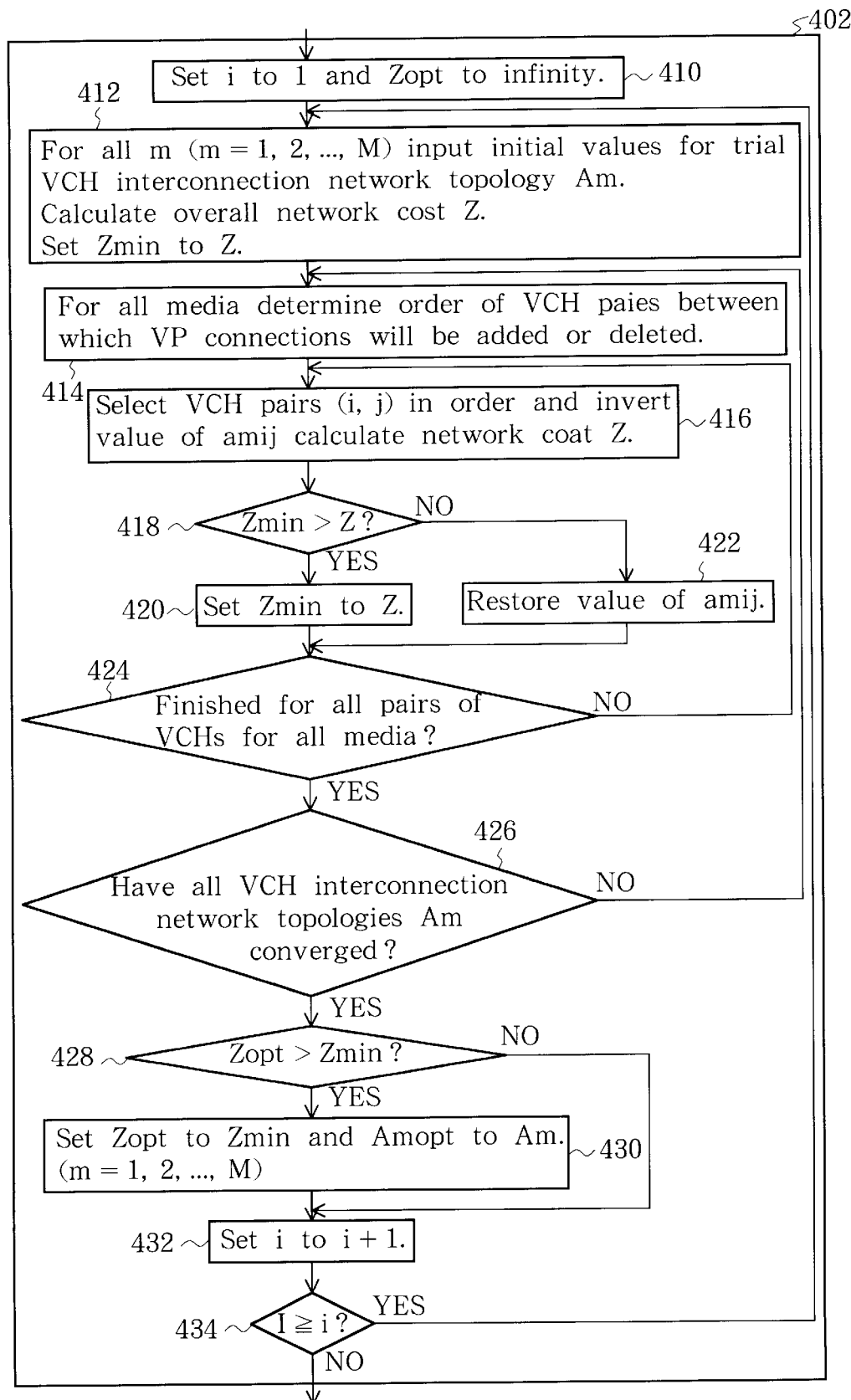
FIG. 25 shows an example of a method for designing VCH interconnection network topologies simultaneously for each of M media.
Figure 26:
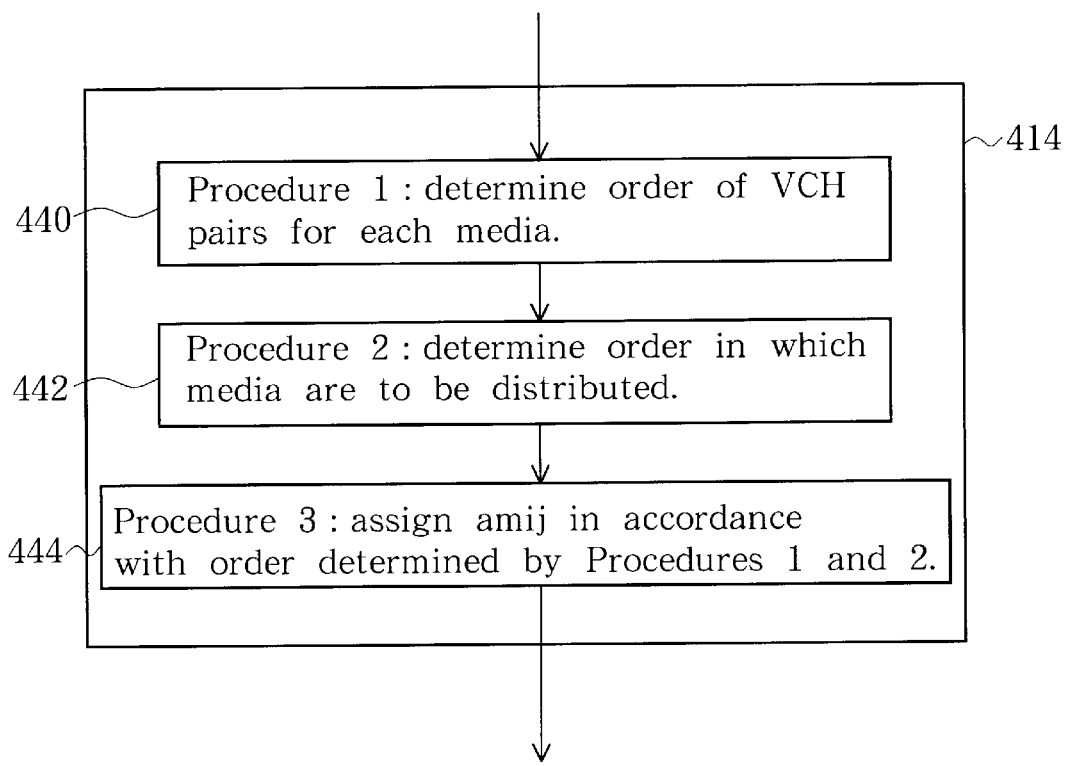
FIG. 26 shows the flow of a method for determining the order of pairs of VCHs between which VP connections will be added or deleted.

By repeatedly adding and deleting VP connections between VCHs in VC networks for all media, the method illustrated in FIG. 25 optimizes VCH interconnection network topologies and establishes all VCH interconnection networks so that the overall network cost resulting from all media is minimized. After the calculation of network cost Z, the order of the VCH pairs between which VP connections will be added and deleted is determined for all media in step 414. An example of the method used in step 414 for determining this order will be explained with reference to FIG. 26 and FIG. 27.

Figure 27:
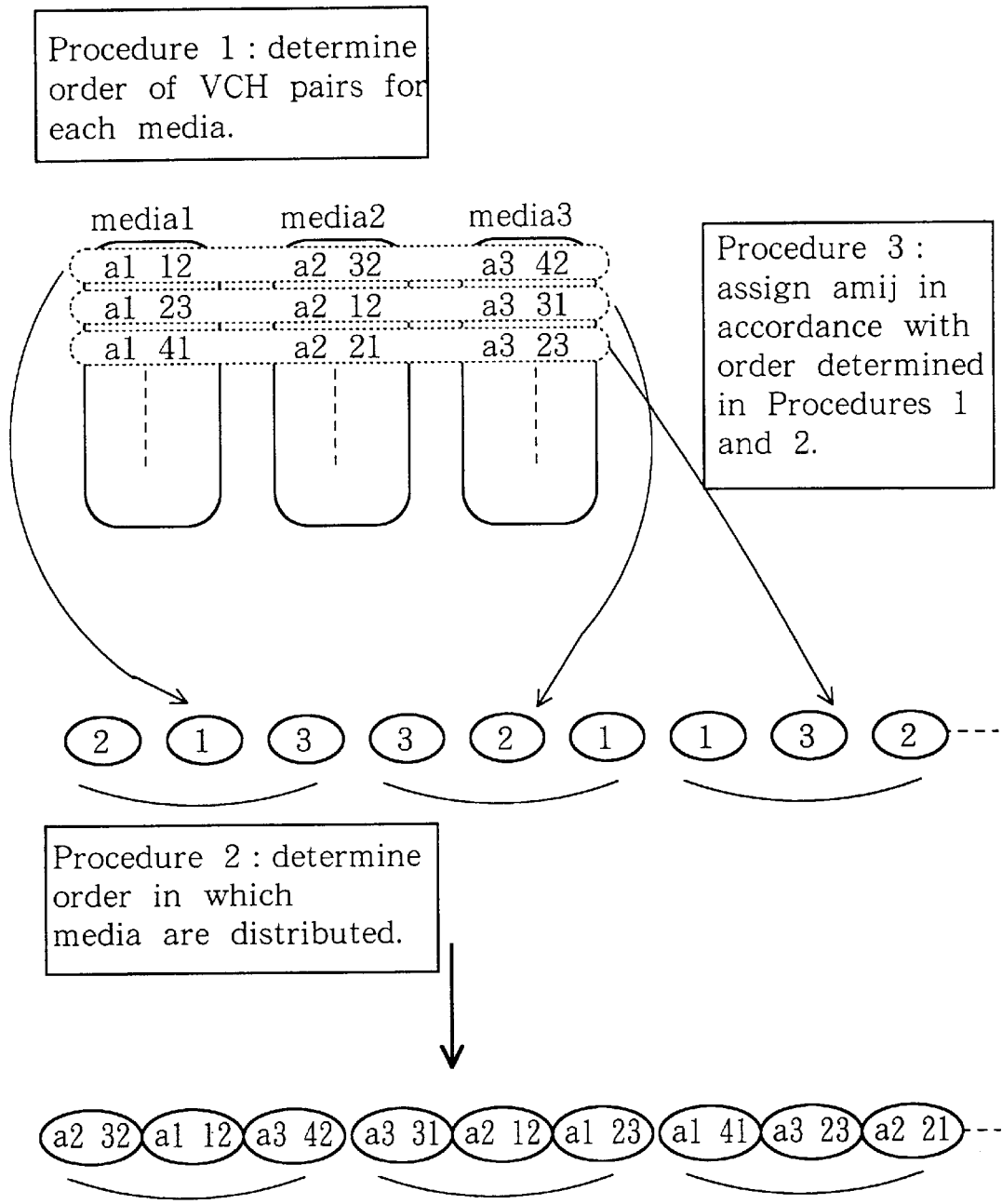
FIG. 27 explains the method illustrated in FIG. 26.

First, as Procedure 1 in step 440, the order of VCH pairs is determined for each media. An example for the case where there are three media is shown in FIG. 27. Next, as Procedure 2 in step 442, the order in which the media are distributed is determined. In the example given in FIG. 27, this order is: media 2, media 1, media 3, media 2, . . . . When there are three media, the order of the first three VCH pairs may be determined by selecting from the media in random order. This random order is then repeated every three pairs. Next, as Procedure 3 in step 444, VCH pairs $am_{ij}$ are assigned in accordance with the order determined by Procedures 1 and 2. An example of this is shown in FIG. 27. VCH pairs $am_{ij}$ are selected in turn in accordance with the order determined in Procedure 3, and the value of $am_{ij}$ is inverted in step 416. In other words, if $am_{ij}=1$, it is changed to "0", and if $am_{ij}=0$, it is changed to "1". VP routes and capacities and VC routes that will guarantee the quality required of media m (e.g., call blocking probability, cell loss probability, and delay) and result in lower network cost are obtained for the altered VCH interconnection network topology for media m; a VCH interconnection network configuration is obtained for media m; and overall network cost Z is calculated in step 416. At this point, VCH interconnection networks for media other than media m do not change. It is then decided in step 418 whether $Z_{min}>Z$. If so, the value of Z is substituted for $Z_{min}$ in step 420. This signifies that it is possible that the VCH interconnection network topology at that point in time will become an optimal solution. If $Z_{min}$ is not greater than Z, the value of $am_{ij}$ is restored to its value prior to the change in step 422. It is then decided whether the foregoing processing has been performed for VCH pairs of all the media in step 424. If it has, processing proceeds to step 426. If not, the same processing is performed on the next VCH pair (i,j) of media m in the sequence. Next, for all m, it is decided in step 426 whether the VCH interconnection network topology Am for media m has converged. Convergence of a VCH interconnection network topology means that there is no change, at the point in time of this decision, in VCH interconnection network topologies Am (for all m, where m=1, 2, . . . , M) prior to starting processing step 414 for determining the order of the VCH pairs. If it is decided that there has been convergence, the processing proceeds to step 428. If it is decided that convergence has not occurred, the processing returns to determining the order of VCH pairs between which VP connections will be added or deleted, and the same processing as described above is repeated. In the subsequent processing step 428, it is decided whether $Z_{opt}>Z_{min}$. If so, $Z_{opt}$ and $Am_{opt}$ are updated with the values of $Z_{min}$ and Am, respectively in step 430. The value of i is increased by 1 in step 432 and it is decided in step 434 whether I≧i for a predetermined I. If so, processing returns to step 412 and the operations described above are repeated. In the present case, I is the number of times that a trial VCH interconnection network topology is formed. If it is decided that I is not greater than or equal to i, this processing step 402 illustrated in FIG. 25 is terminated. As a result of this processing, a VCH interconnection network for each media can be established for all the media.

Because a VCH interconnection network topology is designed simultaneously for each media, VCH interconnection networks suited to the characteristics of the respective media can be established while taking into consideration the effects which the respective VCH interconnection networks have on each other. As a result, efficient use can be made of network resources.

Figure 28:
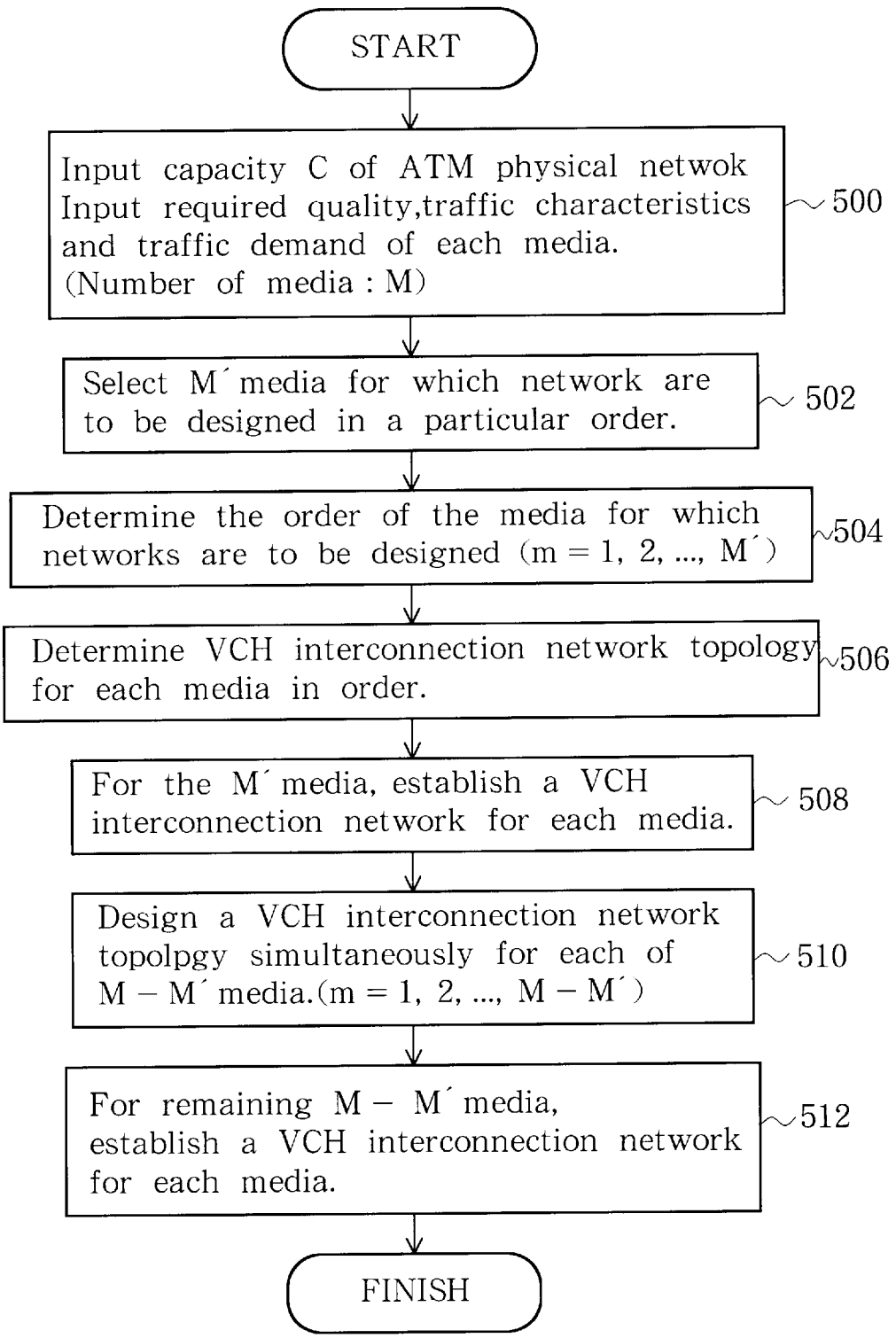
FIG. 28 shows the processing flow for establishing VCH interconnection networks by combining the method for designing a VCH interconnection network topology for each media in a particular order with the method for designing simultaneously.
Figure 29:
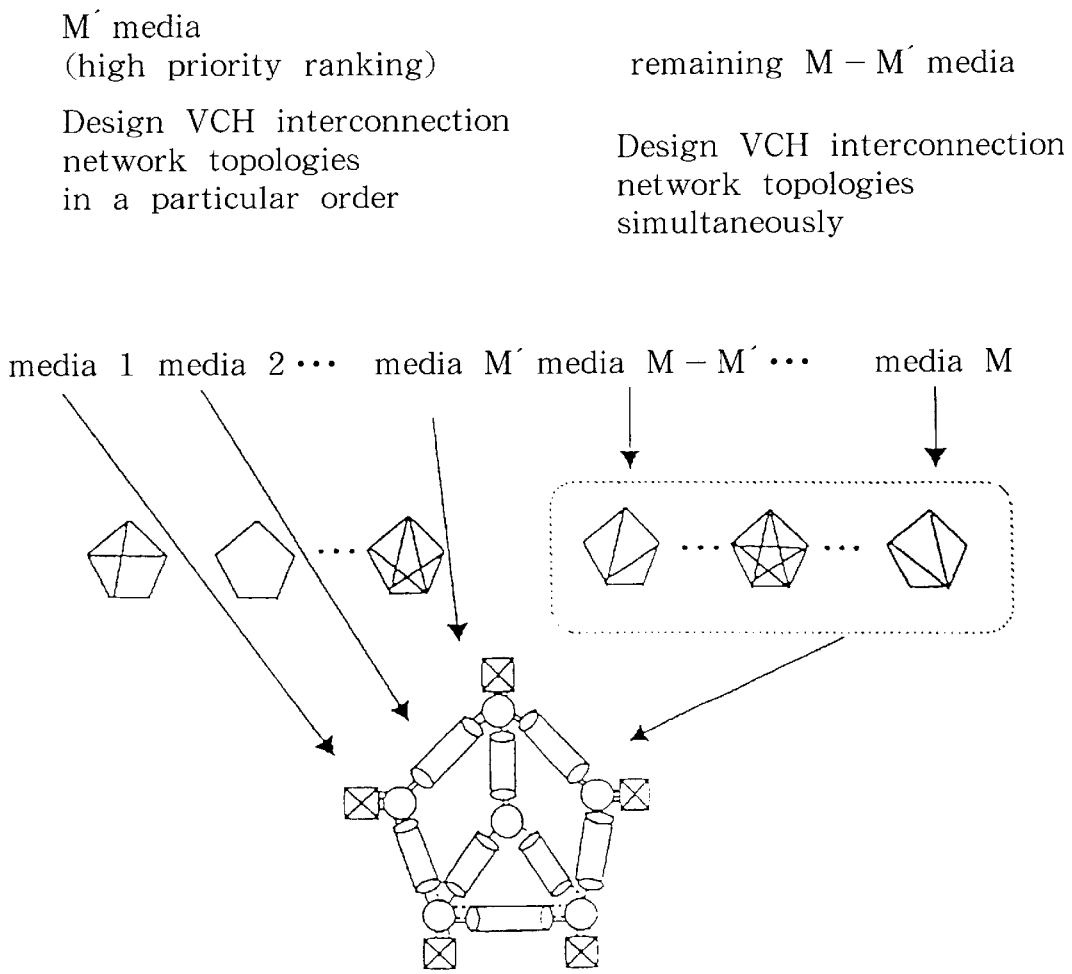
FIG. 29 explains the design method illustrated in FIG. 28.

FIG. 28 and FIG. 29 show a method for establishing VCH interconnection networks by combining the method for designing VCH interconnection network topologies for respective media in a particular order with the method for designing them simultaneously. FIG. 28 shows the processing flow, while FIG. 29 explains the design method.

In the method illustrated in FIG. 28, the capacity C (a vector quantity) of the ATM physical network is first input to operation system OpS in step 500. Capacity C includes information regarding the capacity of each VCH and each VPH, the capacity of each transmission link, and so forth. When there are M media, the characteristics of each of these M media are input to the OpS. Specifically, items thus input include the required quality (call blocking probability, cell loss probability, delay), traffic characteristics (VBR or CBR), traffic demand (geographical distribution of traffic), and so forth.

Next, M' media are selected from the M media in step 502. Because priority is given to the design of VCH interconnection network topologies for the M' media, the selection of the M' media may involve, by way of example, selecting media which may have a large influence on network cost. For the M' media that are selected, the media order in which networks are to be established is determined in step 504, a VCH interconnection network topology is designed for each media in this order in step 506, and VCH interconnection networks are established in step 508.

Thereafter, respective VCH interconnection network topologies for the remaining M–M' media are designed in step 510. At this point, the capacity of the given physical network is the remaining capacity of the part occupied by the VCH interconnection networks of the M media which have been established as described above. When this processing is completed, a VCH interconnection network for each media is established for the remaining M–M' media in step 512.

By establishing VCH interconnection networks by combining the method for designing VCH interconnection network topologies for respective media in a particular order with the method for designing a plurality of VCH interconnection network topologies simultaneously, media with a high priority ranking can obtain preferential assignment of network resources, while the remaining media can obtain efficient assignment of network resources that involves taking into consideration the mutual influence of each VCH interconnection network.

Figure 30:
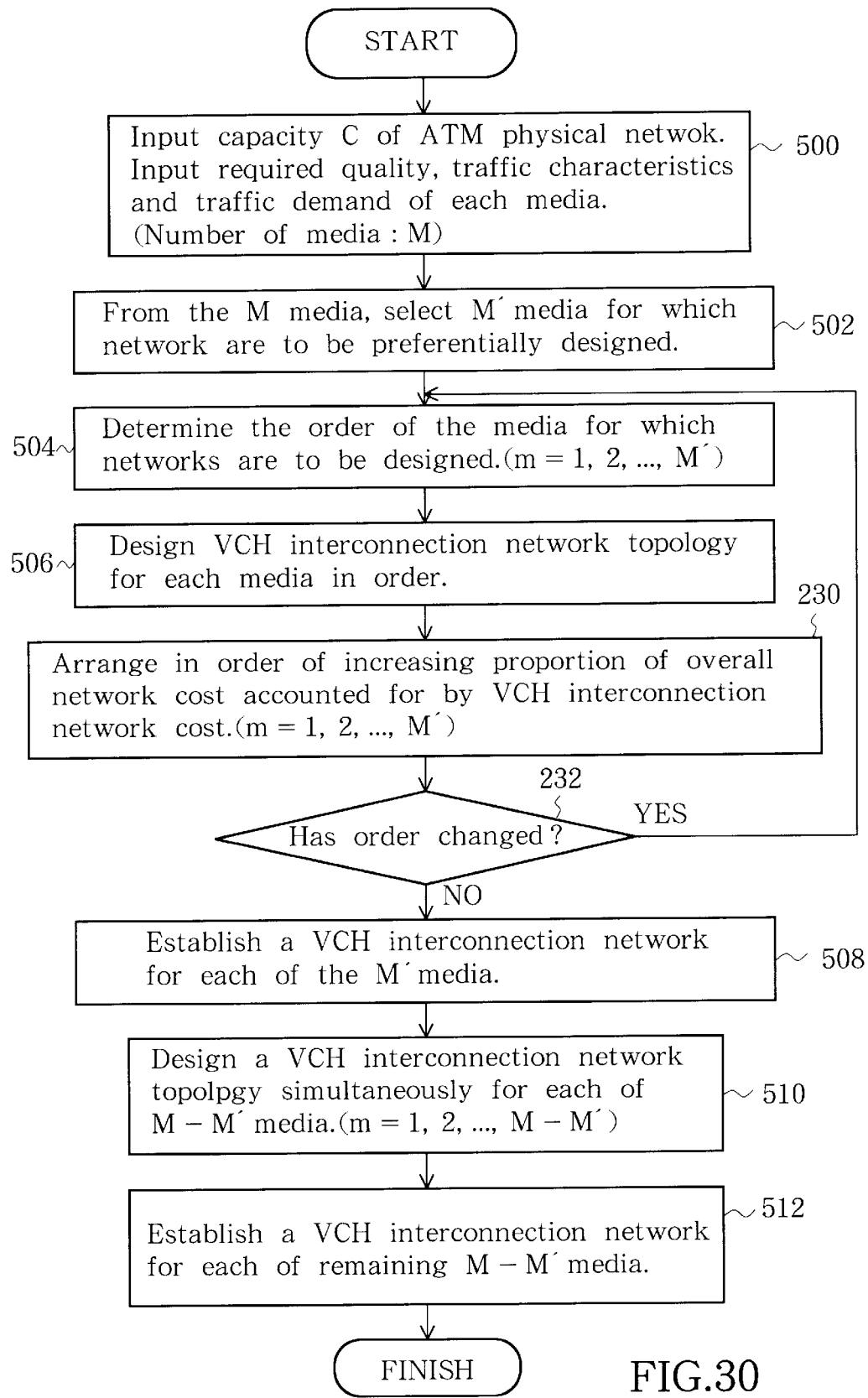
FIG. 30 shows another method for establishing VCH interconnection networks by combining the method for designing a VCH interconnection network topology for each media in a particular order with the method for simultaneously designing a plurality of VCH interconnection network topologies.

FIG. 30 shows another method for establishing VCH interconnection networks by combining the method for designing VCH interconnection network topologies for respective media in a particular order with the method for designing a plurality of VCH interconnection network topologies simultaneously. This method differs from the method illustrated in FIG. 28 and FIG. 29 in that M' media for preferential network establishment are selected from the M media, and VCH interconnection network topologies are designed for these M' media in the order of decreasing proportion of overall network cost accounted for by the VCH interconnection network cost of a given media. In other words, this method differs from the method illustrated in FIG. 28 and FIG. 29 in that the method illustrated in FIG. 20 is utilized.

In this method, media with a high priority ranking can obtain preferential assignment of network resources, while the remaining media can obtain efficient assignment of network resources that involves taking into consideration the mutual influence of each VCH interconnection network. In particular, because the media are arranged in the order of decreasing proportion of overall network cost accounted for by their respective VCH interconnection networks, and because VCH interconnection network topologies for the respective media are designed in accordance with this order, media which have a large influence on overall network cost are established first. Accordingly, overall network cost can be reduced; VCH interconnection networks suited to the characteristics of the respective media can be established; and efficient use can be made of network resources.

Figure 31:
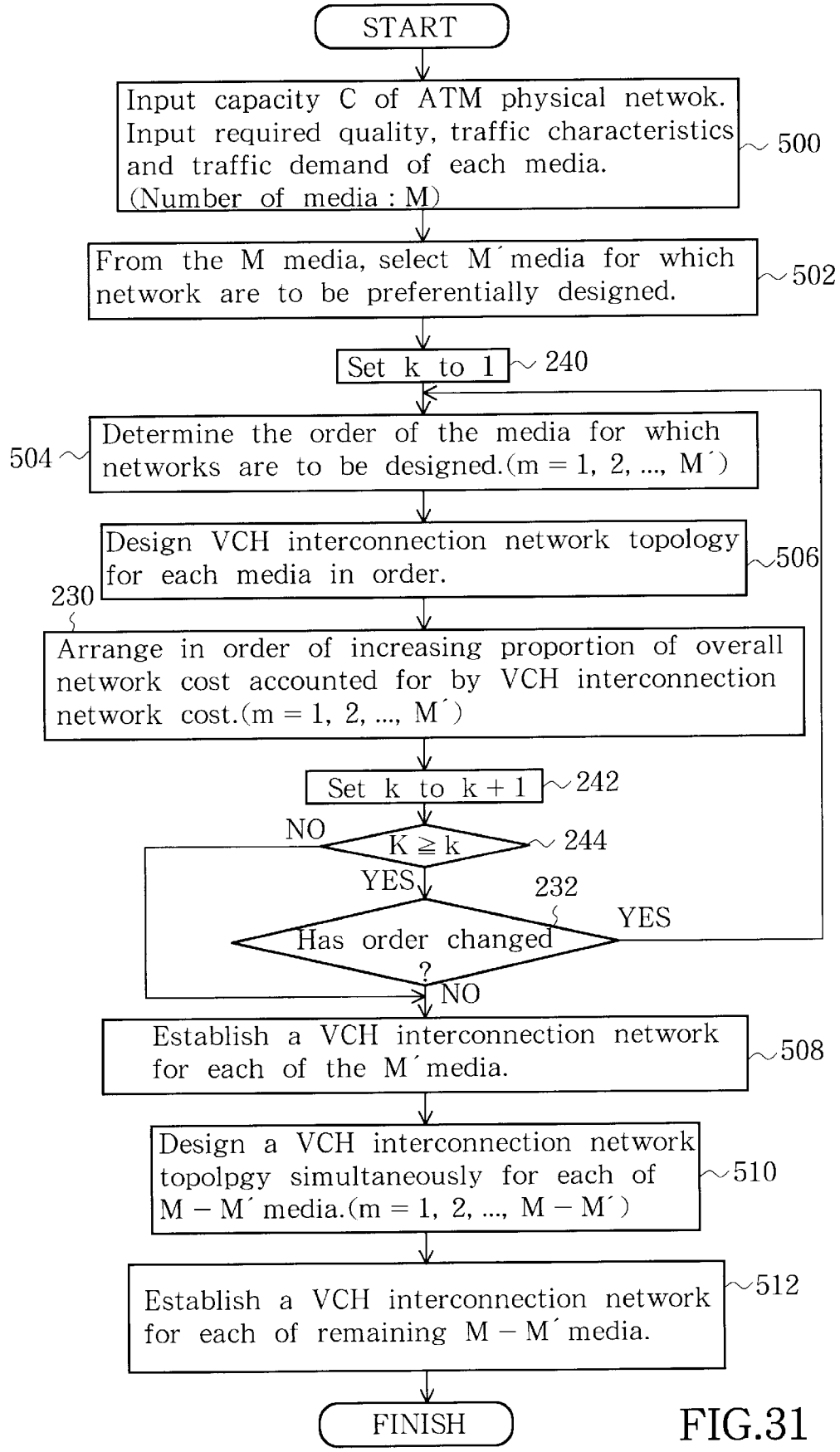
FIG. 31 shows still another method for establishing VCH interconnection networks.

In FIG. 31, in similar manner to the method illustrated in FIG. 28 and FIG. 29 and to the method illustrated in FIG. 30, VCH interconnection networks are established by combining the method for designing VCH interconnection network topologies for respective media in a particular order with the method for designing a plurality of VCH interconnection network topologies simultaneously. However, the method shown in FIG. 31 differs in that the number of times a VCH interconnection network topology is designed for each media is set in advance: in other words, it differs in that the method illustrated in FIG. 21 is utilized.

Namely, when establishing networks for M' media, the number of times a VCH interconnection network topology is designed for each media is set in advance in step 600, and even though the order has changed, if this number of times will be exceeded, it is decided that a VCH interconnection network topology has been designed for each of the M' media, and the processing shifts to the method for designing the remaining M–M' VCH interconnection network topologies simultaneously. Accordingly, because the time spent in calculating and thereby establishing a VCH interconnection network is restricted, communication networks can be established efficiently.

As explained above, this invention establishes a different VCH interconnection network for each media and establishes VC networks on the basis of these VCH interconnection networks. Consequently, the VC network is not designed to guarantee the highest quality (call blocking probability, cell loss probability and delay) required, and excessive network resources are not given to media which do not require such high quality.

In addition, network cost can be reduced by setting the capacity of the physical network (i.e., the capacity of transmission links, VCHs and VPHs) and the qualities required for a plurality of media as constraints, and by establishing a respective VCH interconnection network for each media on the basis of the media characteristics (traffic type, traffic demand) that have been input, so that overall network cost is minimized when the VCH interconnection network topologies constituted by the plurality of media are combined.

As has been explained above, this invention establishes a different VCH interconnection network for each media in correspondence with the quality required by the media or the media traffic characteristics. It can therefore utilize this to establish VC networks that connect subscribers. Moreover, when a plurality of media coexist in a communication network, it can design the network on the basis of minimum network cost. The constituent elements of the communication network can therefore be utilized effectively. Furthermore, communication networks in which a plurality of media coexist can be designed quickly by means of this invention.

While the present invention has been described in conjunction with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method of designing a communication network comprising the steps of:

physically connecting, by means of a transmission link network, a plurality of virtual channel handlers having subscribers connected thereto, said plurality of virtual channel handlers switching data to be transmitted over said transmission link network in units of virtual channels, and a virtual path handler which changes information transfer routes between virtual channel handlers in units of virtual paths that accommodate a plurality of said virtual channels;

establishing a virtual path network on said transmission link network, said virtual path network being formed from virtual paths which logically connect said plurality of virtual channel handlers;

establishing a virtual channel network on said virtual path network, said virtual channel network being formed from said virtual channels which logically connect subscribers on said transmission link network;

establishing a virtual channel handler interconnection network on said transmission link network for each media having information to be transferred on said transmission link network; and forming said virtual channel network corresponding to a given media by means of the virtual channel handler interconnection network, so that a plurality of independent virtual channel networks for different media are established simultaneously on a single physical network.

2. A communication network design method as set forth in claim 1, wherein a virtual path is established in said step of establishing said virtual path network such that said virtual path includes only two virtual channel handlers, one at each termination thereof.

3. A communication network design method as set forth in claim 1 or 2, wherein said virtual channel handler interconnection network is established by assigning different virtual paths to each media having information to be transferred.

4. A communication network design method as set forth in claim 1 or 2, wherein said virtual channel handler interconnection network is established by allowing a plurality of media with a same destination virtual channel handler to be assigned a single virtual path.

5. A communication network design method as set forth in claim 4, further comprising a step of controlling virtual channels with a same destination in accordance with a priority ranking of said media having information to be transferred.

6. A communication network design method as set forth in claim 1 or 2, wherein network topologies of a plurality of virtual channel handler interconnection networks for different kinds of media are designed simultaneously after taking their overall optimization into consideration in said step of establishing said virtual channel handler interconnection network.

7. A communication network design method as set forth in claim 6, wherein said overall optimization of a communication network topology is obtained by calculating a network resource efficiency from a working virtual path ratio, which is defined as a ratio of working virtual path capacity to total capacity of working and back-up virtual paths and from a virtual path use efficiency, which is calculated from a traffic type, traffic demand and required cell loss probability of virtual channels.

8. A communication network design method as set forth in claim 7, wherein said network resource efficiency is obtained by:

setting a number of disjoint routes D which corresponds to a number of paths between an origin and a destination virtual channel handler which do not pass through a same virtual channel handler or virtual path link, as a constraint to be satisfied;

forming a trial network topology such that a total length of all virtual path links is minimized; and changing said number of disjoint routes D when said trial network topology is changed.

9. A communication network design method as set forth in claim 7, wherein said network topology is designed so that an overall communication network cost is minimized.

10. A communication network design method as set forth in claim 9, wherein connection or disconnection of virtual path connections between virtual channel handlers for establishing said virtual channel handler interconnection network is performed in parallel with establishing virtual channel handler interconnection networks for other media.

11. A communication network design method as set forth in claim 9, wherein network topologies are designed after setting an upper limit for a number of virtual paths passed through from an origin virtual channel handler to a destination virtual channel handler.

12. A communication network design method as set forth in claim 1 or 2, wherein network topologies of a plurality of virtual channel handler interconnection networks for different kinds of media or service are designed in a predetermined order.

13. A communication network design method as set forth in claim 12, wherein a design priority order of said network topologies is set based on decreasing network cost of said media supported by its virtual channel handler interconnection networks.

14. A communication network design method as set forth in claim 12, further comprising the steps of:

calculating a proportion of overall network cost accounted for by said network cost of said virtual channel handler interconnection network for each media;

setting a design priority order in accordance with a result of said calculation; and repeating said design of network topologies in accordance with a new design priority order if said design priority order is different from a previously determined design priority.

15. A communication network design method as set forth in claim 14, wherein a limit is set on a number of repetitions in said repeating step.

16. A communication network design method as set forth in claim 1 or 2, further comprising the step of classifying said different media into a priority group and a non-priority group according to their network cost; and wherein said virtual channel interconnection network for said priority group established in said establishing a virtual channel handler interconnection step is performed in an order of decreasing network cost; and wherein said virtual channel handler interconnection network for said non-priority group is established simultaneously in a manner such that overall network cost is minimized.

17. Communication equipment comprising:

a plurality of virtual channel handlers which perform switching in units of virtual channels;

at least one subscriber connected to each virtual channel handler;

a virtual path handler which changes over routes of data in units of virtual paths which accommodate a plurality of said virtual channels;

a transmission link network which physically connects said plurality of virtual channel handlers and said virtual path handler; and a control means which establishes a virtual path network on said transmission link network, said virtual path network being formed from virtual paths which logically connect said plurality of virtual channel handlers, and which also establishes a virtual channel network on said virtual path network, said virtual channel network being formed from virtual channels which logically connect subscribers on said transmission link network;

said control means including:

a virtual channel handler interconnection network establishing means which establishes, on said virtual path network, a virtual channel handler interconnection network for each media having information to be transferred; and a means for establishing virtual channel networks corresponding to said each media by means of respective virtual channel handler interconnection networks, whereby a virtual channel network for said each media is established simultaneously on a single physical network.

* * * * *